(12) United States Patent
Togawa

(10) Patent No.: US 11,361,901 B2
(45) Date of Patent: Jun. 14, 2022

(54) MULTILAYER CERAMIC ELECTRONIC COMPONENT WITH GLASS COMPONENT, PLATING LAYER, AND SEMICONDUCTOR LAYER

(71) Applicant: Murata Manufacturing Co., Ltd., Nagaokakyo (JP)

(72) Inventor: Makoto Togawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 16/867,616

(22) Filed: May 6, 2020

(65) Prior Publication Data

US 2020/0388439 A1 Dec. 10, 2020

(30) Foreign Application Priority Data

Jun. 7, 2019 (JP) .............................. JP2019-106603

(51) Int. Cl.
*H01G 4/232* (2006.01)
(52) U.S. Cl.
CPC ................. *H01G 4/2325* (2013.01)
(58) Field of Classification Search
None
See application file for complete search history.

(56) References Cited

U.S. PATENT DOCUMENTS

| 5,963,416 | A | * | 10/1999 | Honda | ................ | H01F 41/046 |
| | | | | | | 361/306.1 |
| 6,288,887 | B1 | * | 9/2001 | Yoshida | ............... | H05K 3/3426 |
| | | | | | | 361/306.1 |
| 6,310,757 | B1 | * | 10/2001 | Tuzuki | .................. | H01C 1/142 |
| | | | | | | 29/25.41 |
| 6,621,011 | B1 | * | 9/2003 | Daidai | .................. | H01C 1/034 |
| | | | | | | 174/258 |

(Continued)

FOREIGN PATENT DOCUMENTS

| CN | 102832046 A | * | 12/2012 | ............. H01G 4/005 |
| JP | 04-157713 A | | 5/1992 | |

(Continued)

OTHER PUBLICATIONS

Translation_KR1020150031908_ Korea. KIPO (Year: 2015).*
Advanced_ceramic_components. ELSEVIER (Year: 2020).*

*Primary Examiner* — Timothy J. Dole
*Assistant Examiner* — Muhammed Azam
(74) *Attorney, Agent, or Firm* — Keating & Bennett, LLP

(57) ABSTRACT

A multilayer ceramic electronic component includes a rectangular parallelepiped stacked body having first and second main surfaces and first and second end surfaces, and first and second external electrodes. The first external electrode is provided on a portion of the second main surface and on the first end surface, and the second external electrode is provided on a portion of the second main surface and on the second end surface. A semiconductor layer is provided at the interface between the stacked body and a portion of the first (Continued)

external electrode that is located on the portion of the second main surface, and a semiconductor layer is provided at the interface between the stacked body and a portion of the second external electrode that is located on the portion of the second main surface.

16 Claims, 11 Drawing Sheets

(56) References Cited

U.S. PATENT DOCUMENTS

| | | | | |
|---|---|---|---|---|
| 7,018,864 B2* | 3/2006 | Noda | C03C 8/14 | 257/678 |
| 7,067,173 B2* | 6/2006 | Miki | C03C 8/18 | 29/25.41 |
| 7,570,477 B2* | 8/2009 | Kayatani | H01G 4/2325 | 361/306.3 |
| 7,683,269 B2* | 3/2010 | Yoshizawa | H01G 4/40 | 174/524 |
| 7,933,113 B2* | 4/2011 | Motoki | H01G 4/30 | 361/309 |
| 8,014,123 B2* | 9/2011 | Kayatani | H01G 4/232 | 361/306.3 |
| 8,094,432 B2* | 1/2012 | Motoki | H01G 4/005 | 361/321.2 |
| 8,102,640 B2* | 1/2012 | Ogawa | H01G 4/232 | 361/306.3 |
| 8,130,485 B2* | 3/2012 | Ogawa | H01G 4/30 | 361/309 |
| 8,149,566 B2* | 4/2012 | Motoki | H01G 4/232 | 361/305 |
| 8,254,081 B2* | 8/2012 | Nishihara | H01G 4/30 | 361/300 |
| 8,520,361 B2* | 8/2013 | Motoki | H01G 4/2325 | 361/306.1 |
| 8,547,683 B2* | 10/2013 | Saruban | H01G 4/30 | 361/306.3 |
| 8,587,923 B2* | 11/2013 | Ogawa | H01G 4/30 | 361/306.3 |
| 8,607,445 B1* | 12/2013 | Das | H01G 4/33 | 29/832 |
| 8,633,636 B2* | 1/2014 | Iwanaga | H01G 4/232 | 310/366 |
| 8,687,344 B2* | 4/2014 | Akazawa | H01G 4/005 | 361/303 |
| 8,730,646 B2* | 5/2014 | Kawasaki | H01G 4/232 | 361/305 |
| 8,773,839 B2* | 7/2014 | Yamashita | H01G 4/005 | 361/321.2 |
| 8,797,711 B2* | 8/2014 | Matsumoto | H01G 4/30 | 361/306.3 |
| 8,971,016 B1* | 3/2015 | Nagamoto | H01G 4/008 | 361/311 |
| 8,988,850 B1* | 3/2015 | Kodama | H01G 4/30 | 361/301.4 |
| 8,988,854 B1* | 3/2015 | Zenzai | H01G 4/232 | 361/303 |
| 9,177,724 B2* | 11/2015 | Abe | H01G 4/08 | |
| 9,214,282 B1* | 12/2015 | Ikeda | H01G 4/232 | |
| 9,390,858 B2* | 7/2016 | Abe | H01G 4/248 | |
| 9,437,365 B2* | 9/2016 | Saito | H01G 4/252 | |
| 9,607,763 B2* | 3/2017 | Sasabayashi | H01G 4/008 | |
| 9,633,793 B2* | 4/2017 | Nishisaka | H01G 4/30 | |
| 9,805,846 B2* | 10/2017 | Feichtinger | H01G 4/30 | |
| 10,262,801 B2* | 4/2019 | Itamochi | H01F 27/292 | |
| 10,361,035 B1* | 7/2019 | Song | H01G 4/224 | |
| 10,381,157 B2* | 8/2019 | Ando | H01G 2/06 | |
| 10,395,840 B1* | 8/2019 | Park | H01G 4/224 | |
| 10,453,613 B2* | 10/2019 | Zenzai | H01G 4/2325 | |
| 10,453,614 B2* | 10/2019 | Nakamura | H01G 4/30 | |
| 10,573,459 B2* | 2/2020 | Akiyoshi | H01G 4/30 | |
| 10,825,611 B1* | 11/2020 | Fukuoka | H01G 4/248 | |
| 10,957,487 B2* | 3/2021 | Ishizuka | H01G 4/1209 | |
| 2001/0017420 A1* | 8/2001 | Iwao | H01F 41/046 | 257/758 |
| 2003/0086237 A1* | 5/2003 | Miki | H01G 4/232 | 361/321.2 |
| 2003/0169556 A1* | 9/2003 | Yokoyama | B05C 1/027 | 361/309 |
| 2003/0189817 A1* | 10/2003 | Yoshii | H01G 2/065 | 361/773 |
| 2004/0042156 A1* | 3/2004 | Devoe | H01G 4/38 | 361/321.2 |
| 2004/0043599 A1* | 3/2004 | Takeshima | H01G 4/30 | 438/622 |
| 2005/0276002 A1* | 12/2005 | Sridharan | C03C 8/14 | 361/321.1 |
| 2006/0187613 A1* | 8/2006 | Yoshii | H01G 4/2325 | 361/321.2 |
| 2006/0238948 A1* | 10/2006 | Tominaga | H01G 4/2325 | 361/118 |
| 2006/0256495 A1* | 11/2006 | Tominaga | H01G 4/2325 | 361/118 |
| 2007/0242416 A1* | 10/2007 | Saito | H01G 4/2325 | 361/321.1 |
| 2008/0081200 A1* | 4/2008 | Katsube | H01G 4/2325 | 428/457 |
| 2008/0118721 A1* | 5/2008 | Horie | H01C 1/148 | 428/209 |
| 2008/0130199 A1* | 6/2008 | Omura | H01G 4/2325 | 361/321.3 |
| 2008/0186654 A1* | 8/2008 | Takeshima | H01G 4/232 | 361/313 |
| 2009/0310276 A1* | 12/2009 | Tashima | H01G 4/2325 | 361/303 |
| 2009/0310277 A1* | 12/2009 | Kayatani | H01G 4/005 | 361/306.3 |
| 2009/0310278 A1* | 12/2009 | Tani | H01G 4/232 | 361/306.3 |
| 2009/0323253 A1* | 12/2009 | Kobayashi | H01G 4/232 | 361/301.4 |
| 2010/0290172 A1* | 11/2010 | Motoki | H01G 4/2325 | 361/305 |
| 2011/0122540 A1* | 5/2011 | Ogawa | H01G 4/2325 | 361/305 |
| 2012/0188684 A1* | 7/2012 | Akazawa | H01G 4/005 | 361/321.2 |
| 2012/0300361 A1* | 11/2012 | Togashi | H01G 4/30 | 361/301.4 |
| 2013/0107420 A1* | 5/2013 | Sakurada | H01G 4/2325 | 361/321.1 |
| 2013/0155573 A1* | 6/2013 | Kim | H01G 4/0085 | 361/305 |
| 2013/0170095 A1* | 7/2013 | Oh | H01G 4/2325 | 361/305 |
| 2013/0182369 A1* | 7/2013 | Jeon | H01G 4/2325 | 361/301.4 |
| 2013/0208401 A1* | 8/2013 | Shirakawa | H01G 4/008 | 361/305 |
| 2013/0215552 A1 | 8/2013 | Saito | | |
| 2013/0242456 A1* | 9/2013 | Lee | H01G 4/232 | 361/301.4 |
| 2013/0242457 A1* | 9/2013 | Lee | H01G 4/2325 | 361/301.4 |
| 2013/0250472 A1* | 9/2013 | Lee | H01G 4/012 | 361/301.4 |
| 2014/0016243 A1* | 1/2014 | Suzuki | C04B 35/453 | 361/321.4 |
| 2014/0022689 A1* | 1/2014 | Kwag | H01G 4/232 | 361/301.4 |
| 2014/0043724 A1* | 2/2014 | Kang | H01G 4/2325 | 361/321.2 |
| 2014/0063687 A1* | 3/2014 | Saito | H01G 4/232 | 361/308.1 |
| 2014/0085770 A1* | 3/2014 | Park | H01G 4/232 | 361/305 |
| 2014/0111300 A1* | 4/2014 | Park | B05D 5/12 | 338/22 R |

(56) References Cited

U.S. PATENT DOCUMENTS

| | | | |
|---|---|---|---|
| 2014/0160625 A1* | 6/2014 | Jang | H01G 4/232 361/301.4 |
| 2014/0182907 A1* | 7/2014 | Lee | H01G 4/30 174/258 |
| 2014/0185188 A1* | 7/2014 | Kim | H01G 4/232 361/305 |
| 2014/0198427 A1* | 7/2014 | Kamobe | H01G 4/30 361/301.4 |
| 2014/0204502 A1* | 7/2014 | Chun | H01G 4/2325 361/301.4 |
| 2014/0233148 A1* | 8/2014 | Jeon | H01G 4/30 361/301.4 |
| 2014/0233149 A1* | 8/2014 | Jeon | H01G 4/232 361/301.4 |
| 2014/0240899 A1* | 8/2014 | Chung | H01G 4/2325 361/321.3 |
| 2014/0285947 A1* | 9/2014 | Suga | H01G 4/30 361/301.4 |
| 2014/0290999 A1* | 10/2014 | Park | H01G 4/12 174/260 |
| 2014/0345927 A1* | 11/2014 | Itagaki | H01G 4/232 174/260 |
| 2014/0347783 A1* | 11/2014 | Kisumi | H01G 4/012 361/301.4 |
| 2014/0368967 A1* | 12/2014 | Ahn | H05K 1/181 361/301.4 |
| 2014/0376155 A1* | 12/2014 | Omori | H01G 4/228 361/301.4 |
| 2015/0047890 A1* | 2/2015 | Lee | H05K 1/111 174/260 |
| 2015/0053472 A1* | 2/2015 | Lee | H01G 2/06 174/260 |
| 2015/0075853 A1* | 3/2015 | Lee | H01G 4/232 174/260 |
| 2015/0077898 A1* | 3/2015 | Chung | H01G 4/232 361/301.4 |
| 2015/0084481 A1* | 3/2015 | Mori | H01G 4/252 310/311 |
| 2015/0084487 A1* | 3/2015 | Mori | H01L 41/0472 310/364 |
| 2015/0085422 A1* | 3/2015 | Kim | H01G 4/30 361/301.4 |
| 2015/0090483 A1* | 4/2015 | Moon | H01G 4/2325 174/260 |
| 2015/0109718 A1* | 4/2015 | Choi | H01G 4/12 361/304 |
| 2015/0116898 A1* | 4/2015 | Takashima | H01G 4/30 361/301.4 |
| 2015/0364254 A1* | 12/2015 | Ritter | H01G 4/30 174/260 |
| 2016/0020028 A1* | 1/2016 | Katsuta | H01G 4/0085 361/301.4 |
| 2016/0049241 A1* | 2/2016 | Uno | H01G 4/12 361/303 |
| 2016/0049242 A1* | 2/2016 | Sawada | H01G 4/012 361/301.4 |
| 2016/0049244 A1* | 2/2016 | Kitano | H01G 4/1209 361/301.4 |
| 2016/0049245 A1* | 2/2016 | Kitano | H01G 4/248 361/301.4 |
| 2016/0049246 A1* | 2/2016 | Kitano | H01G 4/30 361/301.4 |
| 2016/0049254 A1* | 2/2016 | Sugita | H01G 4/228 361/301.4 |
| 2016/0049255 A1* | 2/2016 | Sugita | H01G 4/1218 361/301.4 |
| 2016/0093441 A1* | 3/2016 | Ahn | H01G 4/1227 174/260 |
| 2016/0093444 A1* | 3/2016 | Itamura | H01G 2/065 174/260 |
| 2016/0099111 A1* | 4/2016 | Ito | H01G 4/12 361/301.4 |
| 2016/0111216 A1* | 4/2016 | Lee | H01G 4/012 361/301.4 |
| 2016/0126012 A1* | 5/2016 | Kim | H01G 2/065 361/301.4 |
| 2016/0126013 A1* | 5/2016 | Park | H01G 4/30 174/260 |
| 2016/0126918 A1* | 5/2016 | Ahn | H03H 7/0115 333/185 |
| 2016/0128177 A1* | 5/2016 | Ahn | H01G 4/30 361/762 |
| 2016/0141103 A1* | 5/2016 | Hamanaka | H01G 4/232 361/301.4 |
| 2016/0163455 A1* | 6/2016 | Iwama | H01G 4/012 361/301.4 |
| 2016/0172108 A1* | 6/2016 | Ikeda | H01G 4/2325 361/301.4 |
| 2016/0172110 A1* | 6/2016 | Otani | H01L 41/0472 361/301.4 |
| 2016/0189867 A1* | 6/2016 | Zaima | H01G 4/232 361/301.4 |
| 2016/0189868 A1* | 6/2016 | Sasaki | H01G 4/012 361/301.4 |
| 2016/0351332 A1* | 12/2016 | Lee | H01G 4/30 |
| 2016/0372265 A1* | 12/2016 | Hattori | H01G 4/248 |
| 2016/0381802 A1* | 12/2016 | Taniguchi | H05K 1/0243 174/260 |
| 2017/0018363 A1* | 1/2017 | Tanaka | H01G 4/232 |
| 2017/0076864 A1* | 3/2017 | Okai | H01G 4/30 |
| 2017/0076865 A1* | 3/2017 | Tanaka | H01G 4/224 |
| 2017/0076866 A1* | 3/2017 | Okai | H01G 4/30 |
| 2017/0076868 A1* | 3/2017 | Noda | H01G 4/224 |
| 2017/0076869 A1* | 3/2017 | Okai | H01G 4/30 |
| 2017/0076870 A1* | 3/2017 | Noda | H01G 4/232 |
| 2017/0092424 A1* | 3/2017 | Morito | H01G 4/228 |
| 2017/0103852 A1* | 4/2017 | Ando | H01G 2/06 |
| 2017/0103853 A1* | 4/2017 | Zenzai | H01G 4/005 |
| 2017/0162327 A1* | 6/2017 | Mizuno | H01G 4/232 |
| 2017/0171980 A1* | 6/2017 | Hattori | H01G 4/228 |
| 2017/0186539 A1* | 6/2017 | Masuda | H01G 4/248 |
| 2017/0221634 A1* | 8/2017 | Inomata | H01G 4/012 |
| 2017/0250027 A1* | 8/2017 | Kowase | H01G 4/232 |
| 2017/0250028 A1* | 8/2017 | Makino | H01G 4/248 |
| 2017/0330690 A1* | 11/2017 | Doi | C09D 7/20 |
| 2017/0334230 A1* | 11/2017 | Sawada | H01G 4/012 |
| 2017/0345564 A1* | 11/2017 | Ryu | H01G 4/005 |
| 2017/0345566 A1* | 11/2017 | Tanaka | H01G 4/1209 |
| 2017/0352479 A1* | 12/2017 | Sawada | H01G 4/30 |
| 2017/0358396 A1* | 12/2017 | Cho | H01G 4/385 |
| 2017/0359900 A1* | 12/2017 | Sakamoto | H05K 3/363 |
| 2018/0012703 A1* | 1/2018 | Mochigi | H01G 4/012 |
| 2018/0025844 A1* | 1/2018 | Sato | H01G 2/103 361/321.2 |
| 2018/0025845 A1* | 1/2018 | Sato | H01G 2/12 361/321.2 |
| 2018/0040426 A1* | 2/2018 | Wakashima | H01G 4/232 |
| 2018/0042122 A1* | 2/2018 | Wakashima | H05K 1/0271 |
| 2018/0061574 A1* | 3/2018 | Kitamura | H01G 4/012 |
| 2018/0068788 A1* | 3/2018 | Kobayashi | H01F 27/292 |
| 2018/0075970 A1* | 3/2018 | Sato | H01G 4/224 |
| 2018/0082785 A1* | 3/2018 | Asano | H01G 4/14 |
| 2018/0082789 A1* | 3/2018 | Asano | H01G 4/232 |
| 2018/0096793 A1* | 4/2018 | Fukunaga | H01G 4/30 |
| 2018/0108479 A1* | 4/2018 | Sato | H01G 4/228 |
| 2018/0108483 A1* | 4/2018 | Sasabayashi | H01G 4/1209 |
| 2018/0137982 A1* | 5/2018 | Sawada | H01G 4/012 |
| 2018/0151296 A1* | 5/2018 | Yamada | H01G 4/30 |
| 2018/0158608 A1* | 6/2018 | Fujita | H01G 4/224 |
| 2018/0160541 A1* | 6/2018 | Fujita | H05K 1/186 |
| 2018/0166219 A1* | 6/2018 | Noda | C03C 14/006 |
| 2018/0174753 A1* | 6/2018 | Terashita | H01G 4/232 |
| 2018/0294100 A1* | 10/2018 | Ando | H01G 4/30 |
| 2018/0350524 A1* | 12/2018 | Itamochi | H01G 4/38 |
| 2019/0103221 A1* | 4/2019 | Park | H01G 4/12 |
| 2019/0131076 A1* | 5/2019 | Fukumura | H01G 2/065 |
| 2019/0148070 A1* | 5/2019 | Kobayashi | H01G 4/232 174/260 |
| 2019/0189348 A1* | 6/2019 | Choi | H01G 4/232 |
| 2019/0237250 A1* | 8/2019 | Onodera | H01G 4/2325 |

(56) References Cited

U.S. PATENT DOCUMENTS

| | | | |
|---|---|---|---|
| 2019/0237259 A1* | 8/2019 | Onodera | H01G 4/30 |
| 2019/0237261 A1* | 8/2019 | Onodera | H01G 2/06 |
| 2019/0304693 A1* | 10/2019 | Iguchi | H01G 4/012 |
| 2019/0326058 A1* | 10/2019 | Lee | H01G 4/2325 |
| 2019/0362895 A1* | 11/2019 | Kobayashi | H01G 4/2325 |
| 2019/0371527 A1* | 12/2019 | Sugita | H01G 4/232 |
| 2019/0385795 A1* | 12/2019 | Yang | H01G 4/2325 |
| 2020/0075257 A1* | 3/2020 | Kim | H01G 4/2325 |
| 2020/0082980 A1* | 3/2020 | Kwon | H01G 4/012 |
| 2020/0082983 A1* | 3/2020 | Kim | H01G 4/30 |
| 2020/0082987 A1* | 3/2020 | Lee | H01G 4/30 |
| 2020/0090865 A1* | 3/2020 | Kim | H01G 4/30 |
| 2020/0105467 A1* | 4/2020 | Jeong | H01G 4/30 |
| 2020/0105472 A1* | 4/2020 | Song | H01G 4/236 |
| 2020/0118748 A1* | 4/2020 | Kim | H01G 4/232 |
| 2020/0126723 A1* | 4/2020 | Ooe | C04B 35/486 |
| 2020/0152389 A1* | 5/2020 | Kim | H01G 4/012 |
| 2020/0161052 A1* | 5/2020 | Cha | H01G 4/248 |
| 2020/0168400 A1* | 5/2020 | Nakamoto | H01G 4/012 |
| 2020/0185152 A1* | 6/2020 | Uchida | C04B 35/4682 |
| 2020/0388439 A1* | 12/2020 | Togawa | H01G 4/2325 |
| 2021/0057154 A1* | 2/2021 | Zenzai | H01G 4/2325 |
| 2021/0082623 A1* | 3/2021 | Kim | H05K 1/0271 |

FOREIGN PATENT DOCUMENTS

| | | | | |
|---|---|---|---|---|
| JP | 08-306580 A | | 11/1996 | |
| JP | H1154368 A | * | 2/1999 | |
| JP | 2000-021607 A | | 1/2000 | |
| JP | 2013-168526 A | | 8/2013 | |
| KR | 1020150031908 | * | 3/2015 | H01G 4/12 |
| WO | WO-2013108533 A1 | * | 7/2013 | H01G 4/232 |

* cited by examiner

MULTILAYER CERAMIC ELECTRONIC COMPONENT WITH GLASS COMPONENT, PLATING LAYER, AND SEMICONDUCTOR LAYER

CROSS REFERENCE TO RELATED APPLICATIONS

This application claims the benefit of priority to Japanese Patent Application No. 2019-106603 filed on Jun. 7, 2019. The entire contents of this application are hereby incorporated herein by reference.

BACKGROUND OF THE INVENTION

1. Field of the Invention

The present invention relates to a multilayer ceramic electronic component.

2. Description of the Related Art

A conventional multilayer ceramic electronic component typically has external electrodes each composed of an underlying electrode layer, a Ni plating layer, and a Sn plating layer. The underlying electrode layer is formed by applying a Cu or Ag conductive paste and firing it. The Ni plating layer is formed on the underlying electrode layer by plating. The Sn plating layer is formed on the Ni plating layer by plating. The Ni plating layer serves as a barrier layer to prevent the external electrode from being eroded by solder (i.e., solder erosion) at the time of mounting. The Sn plating layer serves as a material for wetting that significantly increases solder wettability over the whole external electrode (see, for example, Japanese Patent Laid-Open No. 8-306580).

In recent years, a multilayer ceramic electronic component may be used in a harsh environment. For example, with the recent electronification of vehicles, as well as the expansion of in-vehicle space, the engine compartment size has been reduced. Accordingly, a vehicle electronic control unit (ECU) is disposed at a place subject to high temperature, such as an engine and transmission.

However, in a ceramic electronic component as disclosed in Japanese Patent Laid-Open No. 8-306580, a ceramic sintered body is typically not bonded to plating layers of external electrodes, and thus the adhesion strength between them tends to be weak (because the ceramic is inherently not bonded to plating layers).

Accordingly, when a ceramic electronic component as disclosed in Japanese Patent Laid-Open No. 8-306580 is mounted on a mounting board with solder, a flux component contained in the solder may penetrate through a weak adhesion portion between the ceramic sintered body and the plating layers of external electrodes, reducing the reliability of the ceramic electronic component.

Further, when used under an environment subject to high temperature, such as an engine and transmission of a vehicle, a ceramic electronic component as disclosed in Japanese Patent Laid-Open No. 8-306580 may degrade its reliability due to gases, such as an exhaust gas and a gas generated from lubricating oil in an engine and transmission of a vehicle.

Specifically, the weak adhesion portion between the ceramic sintered body (stacked body) and the plating layers of external electrodes may allow the penetration of gases, such as an exhaust gas and a gas generated from lubricating oil in an engine and transmission of a vehicle. Such gases may reduce the reliability of the ceramic electronic component.

SUMMARY OF THE INVENTION

Preferred embodiments of the present invention provide reliable multilayer ceramic electronic components by significantly reducing or preventing the penetration of gasses generated from, for example, lubricating oil, through the interface between the stacked body and the external electrodes.

A multilayer ceramic electronic component according to a preferred embodiment of the present invention includes a stacked body, a first external electrode, and a second external electrode. The stacked body includes a plurality of stacked ceramic layers, and a plurality of internal electrode layers stacked on the ceramic layers. The stacked body includes a first main surface and a second main surface opposite to each other in the height direction, a first lateral surface and a second lateral surface opposite to each other in the width direction orthogonal or substantially orthogonal to the height direction, and a first end surface and a second end surface opposite to each other in the length direction orthogonal or substantially orthogonal to the height direction and the width direction. The first external electrode is provided at least on a portion of the second main surface and on the first end surface. The second external electrode is provided at least on a portion of the second main surface and on the second end surface. The plurality of internal electrode layers includes a first internal electrode layer exposed at the first end surface where the first internal electrode layer is electrically connected to the first external electrode, and a second internal electrode layer exposed at the second end surface where the second internal electrode layer is electrically connected to the second external electrode. The first external electrode includes a first underlying electrode layer provided on the stacked body and including a conductive metal and a glass component, and a first plating layer covering the first underlying electrode layer. The second external electrode includes a second underlying electrode layer provided on the stacked body and including a conductive metal and a glass component, and a second plating layer covering the second underlying electrode layer. A semiconductor layer is provided at the interface between the stacked body and a portion of the first external electrode that is located on the portion of the second main surface, and a semiconductor layer is provided at the interface between the stacked body and a portion of the second external electrode that is located on the portion of the second main surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

1. Multilayer Ceramic Electronic Component

Figure 1:
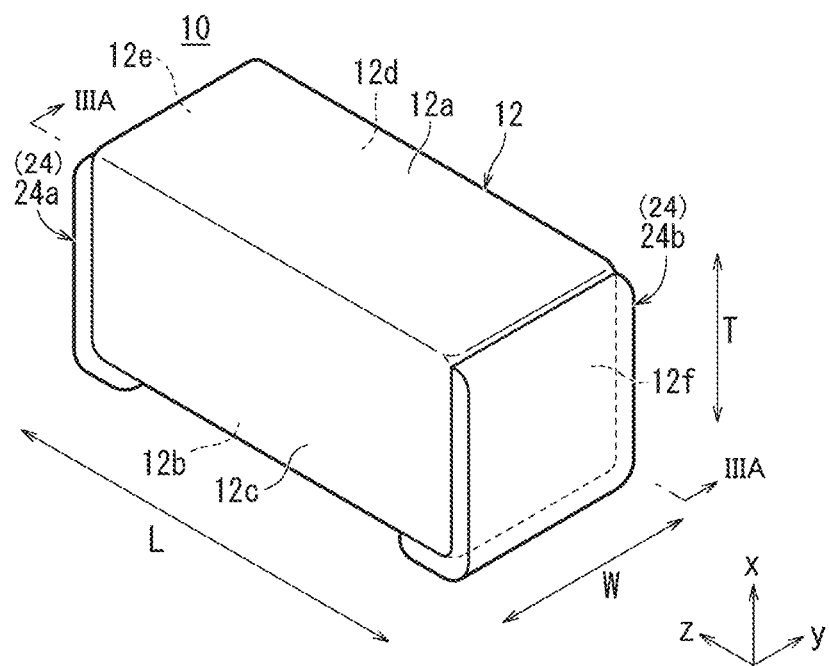
FIG. 1 is an outside perspective view showing a multilayer ceramic capacitor in a first preferred embodiment of the present invention.
Figure 2:
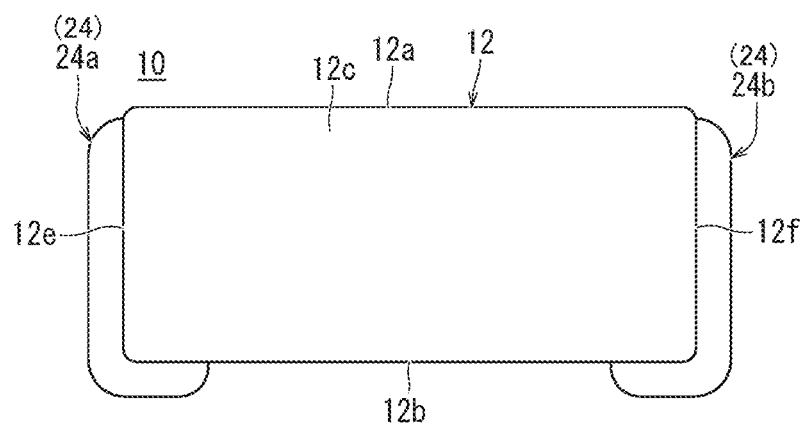
FIG. 2 is a front view of the multilayer ceramic capacitor shown in FIG. 1.
Figure 3A:
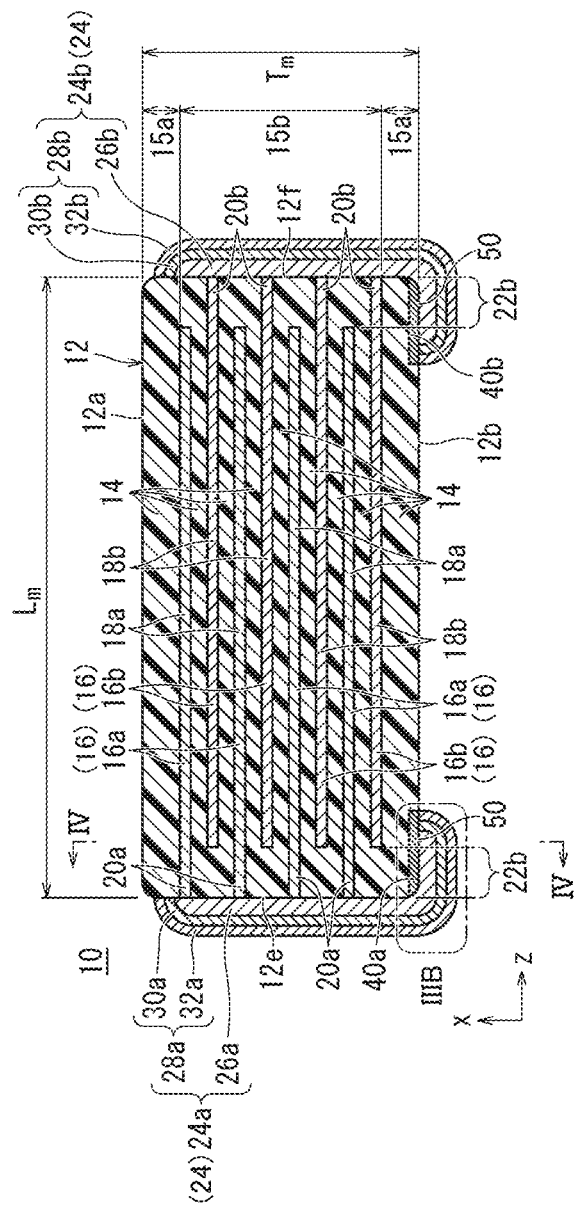
FIG. 3A is a cross-sectional view taken along line IIIA-IIIA shown in FIG. 1.
Figure 3B:
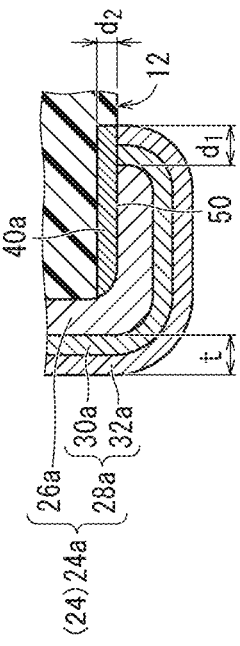
FIG. 3B is an enlarged view of region IIIB shown in FIG. 3A.
Figure 4:
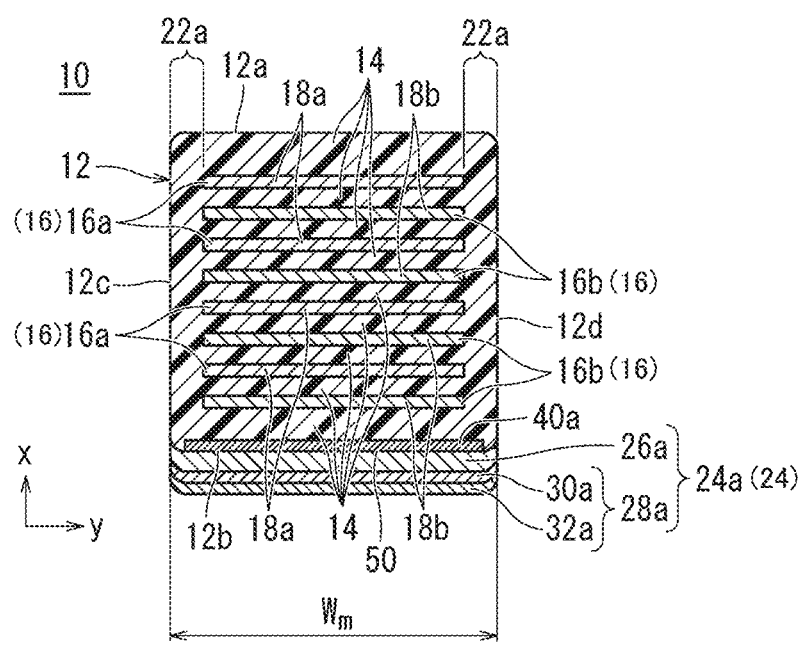
FIG. 4 is a cross-sectional view taken along line IV-IV shown in FIG. 3A.
Figure 5A:
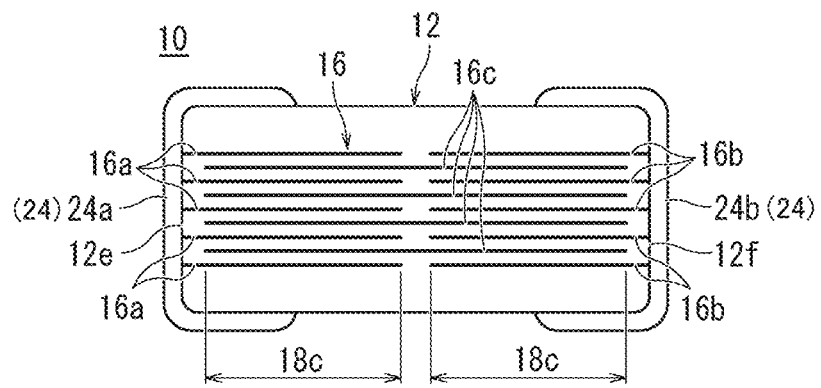
FIG. 5A is a cross-sectional view of a multilayer ceramic capacitor in a first variation.
Figure 5B:
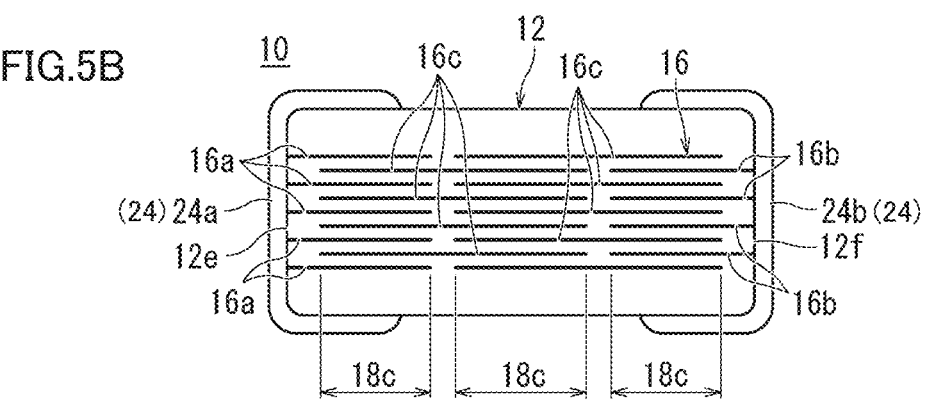
FIG. 5B is a cross-sectional view of a multilayer ceramic capacitor in a second variation.
Figure 5C:
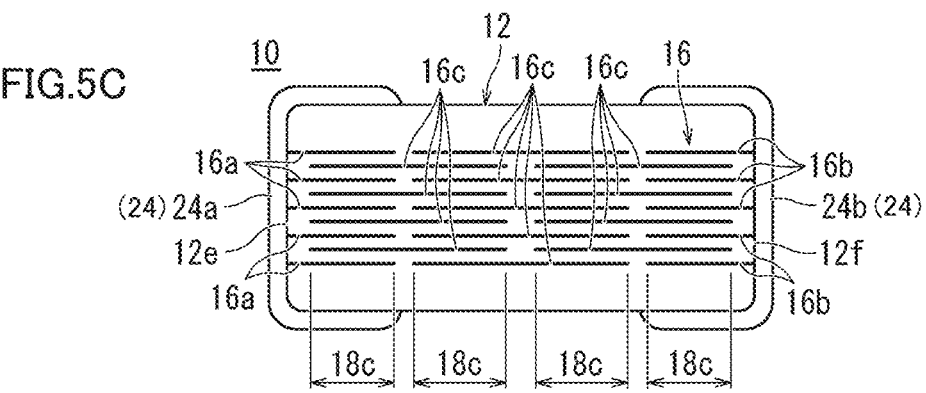
FIG. 5C is a cross-sectional view of a multilayer ceramic capacitor in a third variation.

A multilayer ceramic capacitor will now be described as an example of a multilayer ceramic electronic component according to a preferred embodiment of the present invention. FIG. 1 is an outside perspective view showing a multilayer ceramic capacitor in a first preferred embodiment of the present invention. FIG. 2 is a front view of the multilayer ceramic capacitor shown in FIG. 1. FIG. 3A is a cross-sectional view taken along line IIIA-IIIA shown in FIG. 1. FIG. 3B is an enlarged view of region IIIB shown in FIG. 3A, and is specifically an enlarged cross-sectional view of a bonding portion between an external electrode and a semiconductor layer. FIG. 4 is a cross-sectional view taken along line IV-IV shown in FIG. 3A. FIGS. 5A to 5C are cross-sectional views of multilayer ceramic capacitors according to first to third variations, respectively, based on the first preferred embodiment. The cross sections shown in FIGS. 5A to 5C correspond to the cross section taken along line IIIA-IIIA shown in FIG. 1.

As shown in FIGS. 1 to 4, a multilayer ceramic capacitor includes a rectangular parallelepiped or substantially rectangular parallelepiped stacked body 12.

Stacked body 12 includes a plurality of ceramic layers and a plurality of internal electrode layers 16 which are stacked. Further, stacked body 12 includes a first main surface 12a and a second main surface 12b opposite to each other in height direction x, a first lateral surface 12c and a second lateral surface 12d opposite to each other in width direction y orthogonal or substantially orthogonal to height direction x, and a first end surface 12e and a second end surface 12f opposite to each other in length direction z orthogonal or substantially orthogonal to height direction x and width direction y. The corners and ridge lines of stacked body 12 are preferably rounded, for example. Each corner refers to an intersection of adjacent three planes of the stacked body, and each ridge line refers to an intersection of adjacent two planes of the stacked body. First and second main surfaces 12a, 12b, first and second lateral surfaces 12c, 12d, and first and second end surfaces 12e, 12f may have asperity, in a portion or in the entirety thereof, for example. The dimension of stacked body 12 in length direction z is not necessarily longer than the dimension in width direction y.

The number of ceramic layers 14 is preferably not less than about 10 and not more than about 2000, including the outer layers, for example.

Stacked body 12 includes outer layer sections 15a and an inner layer section 15b. Outer layer sections 15a each include a plurality of ceramic layers 14. Inner layer section 15b includes one or more ceramic layers 14, and a plurality of internal electrode layers 16 provided on ceramic layers 14. Outer layer sections 15a are located adjacent to or in a vicinity of first and second main surfaces 12a, 12b of stacked body 12. Specifically, one of outer layer sections 15a is a collection of a plurality of ceramic layers 14 located between first main surface 12a and internal electrode layer 16 that is closest to first main surface 12a, and the other of outer layer sections 15a is a collection of a plurality of ceramic layers 14 located between second main surface 12b and internal electrode layer 16 that is closest to second main surface 12b. The region sandwiched between both outer layer sections 15a is inner layer section 15b. Each outer layer section 15a preferably has a thickness of not less than about 15 μm and not more than about 400 μm, for example.

Preferably, for example, stacked body 12 has a dimension Lm of not less than about 0.2 mm and not more than about 10.0 mm in length direction z, a dimension Wm of not less than about 0.1 mm and not more than about 10.0 mm in width direction y, and a dimension Tm of not less than about 0.1 mm and not more than about 5.0 mm in height direction x. However, the dimensions of stacked body 12 are not limited to these examples.

Ceramic layers 14 may include, for example, a dielectric material. Examples of the dielectric material include a dielectric ceramic including a component of, for example, $BaTiO_3$, $CaTiO_3$, $SrTiO_3$, or $CaZrO_3$. With any of these dielectric materials included as a primary component, secondary components, less in content than the primary component, may be added in accordance with predetermined characteristics of stacked body 12. Examples of the secondary components include Mn compounds, Fe compounds, Cr compounds, Co compounds, and Ni compounds.

If a piezoelectric ceramic is used as stacked body 12, the multilayer ceramic electronic component defines and functions as a ceramic piezoelectric element. Specific examples of piezoelectric ceramic materials include lead zirconate titanate (PZT) ceramic materials.

If a semiconductor ceramic is used as stacked body 12, the multilayer ceramic electronic component defines and functions as a thermistor element. Specific examples of semiconductor ceramic materials include spinel ceramic materials.

If a magnetic ceramic is used as stacked body 12, the multilayer ceramic electronic component defines and functions as an inductor element. If the multilayer ceramic electronic component defines and functions as an inductor element, internal electrode layers 16 define a coiled conductor. Specific examples of magnetic ceramic materials include ferrite ceramic materials.

Each ceramic layer 14, after being fired, preferably has a thickness of not less than about 0.5 μm and not more than about 10.0 μm, for example.

Stacked body 12 includes a plurality of first internal electrode layers 16a and a plurality of second internal electrode layers 16b, which are, for example, rectangular or substantially rectangular, as a plurality of internal electrode layers 16. The plurality of first internal electrode layers 16a and the plurality of second internal electrode layers 16b are embedded and are alternated and equally or substantially equally spaced along height direction x of stacked body 12. First and second internal electrode layers 16a, 16b may be oriented in parallel or substantially in parallel to or perpendicular or substantially perpendicular to a mounting surface.

First internal electrode layers 16a include first facing electrode portions 18a and first leading electrode portions 20a. First facing electrode portions 18a face second internal electrode layers 16b. First leading electrode portions 20a are located at one end of first internal electrode layers 16a and lead from facing electrode portions 18a to first end surface 12e of stacked body 12. The end of each first leading electrode portion 20a is led to and exposed at first end surface 12e.

Second internal electrode layers 16b include second facing electrode portions 18b and second leading electrode portions 20b. Second facing electrode portions 18b face first internal electrode layers 16a. Second leading electrode portions 20b are located at one end of second internal electrode layers 16b and lead from second facing electrode portions 18b to second end surface 12f of stacked body 12. The end of each second leading electrode portion 20b is led to and exposed at second end surface 12f.

Facing electrode portions 18a of first internal electrode layers 16a on one side and facing electrode portions 18b of second internal electrode layers 16b on the other side preferably have, but are not limited to, a rectangular or substantially rectangular shape, for example. In addition, facing electrode portions 18a of first internal electrode layers 16a on one side and facing electrode portions 18b of second internal electrode layers 16b on the other side may have rounded or inclined (tapered) corners.

First leading electrode portions 20a of first internal electrode layers 16a and second leading electrode portions 20b of second internal electrode layers 16b preferably have, but are not limited to, a rectangular or substantially rectangular shape, for example. In addition, first leading electrode portions 20a of first internal electrode layers 16a and second leading electrode portions 20b of second internal electrode layers 16b may have rounded or inclined (tapered) corners.

First facing electrode portions 18a of first internal electrode layers 16a may have the same or substantially the same width as, or may be larger or smaller in width than, first leading electrode portions 20a of first internal electrode layers 16a. Similarly, second facing electrode portions 18b of second internal electrode layers 16b may have the same or substantially the same width as, or may be larger or smaller in width than, second leading electrode portions 20b of second internal electrode layers 16b.

Stacked body 12 includes lateral portions (W gaps) 22a between first lateral surface 12c and one end of first and second facing electrode portions 18a, 18b in width direction y, and between second lateral surface 12d and the other end of first and second facing electrode portions 18a, 18b in width direction y. Further, stacked body 12 includes end portions (L gaps) 22b between second end surface 12f and the end of first internal electrode layers 16a opposite to first leading electrode portions 20a, and between first end surface 12e and the end of second internal electrode layers 16b opposite to second leading electrode portions 20b.

Internal electrode layers 16 include an appropriate conductive material, for example, a metal (e.g., Ni, Cu, Ag, Pd, Au) or an alloy including at least one of these metals (e.g., Ag—Pd alloy). Internal electrode layers 16 may further include dielectric particles having the same or similar composition as the ceramic included in ceramic layers 14.

Each internal electrode layer 16 preferably has a thickness of not less than about 0.2 µm and not more than about 2.0 µm, for example. The number of internal electrode layers 16 is preferably not less than about 10 and not more than about 2000, for example.

External electrodes 24 are provided on first and second end surfaces 12e, 12f of stacked body 12. External electrodes 24 include a first external electrode 24a and a second external electrode 24b.

First external electrode 24a is provided on the surface of first end surface 12e of stacked body 12, and extends from first end surface 12e to cover at least a portion of the surface of second main surface 12b to be mounted on a mounting surface. In this case, first external electrode 24a is electrically connected to first leading electrode portions 18a of first internal electrode layers 16a.

Second external electrode 24b is provided on the surface of second end surface 12f of stacked body 12, and extends from second end surface 12f to cover at least a portion of the surface of second main surface 12b to be mounted on a mounting surface. In this case, second external electrode 24b is electrically connected to second leading electrode portions 18b of second internal electrode layers 16b.

In stacked body 12, first facing electrode portions 18a of first internal electrode layers 16a and second facing electrode portions 18b of second internal electrode layers 16b face each other, with ceramic layers 14 being interposed between the first facing electrode portions 18a and the second facing electrode portions 18b, thus causing capacitance. This provides a capacitance between first external electrode 24a, to which first internal electrode layers 16a are electrically connected, and second external electrode 24b, to which second internal electrode layers 16b are electrically connected. The characteristics of a capacitor are thus provided.

As shown in FIGS. 5A to 5C, internal electrode layers 16 may include not only first and second internal electrode layers 16a, 16b but also floating internal electrode layers 16c which are not led to either of first and second end surfaces 12e, 12f. With floating internal electrode layers 16c, facing electrode portions 18c may be divided into a plurality of portions. For example, facing electrode portions 18c may include two portions as shown in FIG. 5A, three portions as shown in FIG. 5B, or four portions as shown in FIG. 5C. More than four portions are also possible. With such a structure in which facing electrode portions 18c are divided into a plurality of portions, a plurality of capacitor components are provided between internal electrode layers 16a, 16b, 16c that face each other, with these capacitor components being electrically connected in series. Accordingly, the voltage application to each capacitor component is significantly reduced, and the multilayer ceramic capacitor is able to withstand a higher voltage.

As shown in FIG. 3A, first external electrode 24a includes a first underlying electrode layer 26a and a first plating layer 28a provided on the surface of first underlying electrode layer 26a, in this order from the stacked body 12 side. Similarly, second external electrode 24b includes a second underlying electrode layer 26b and a second plating layer 28b provided on the surface of second underlying electrode layer 26b, in this order from the stacked body 12 side.

First underlying electrode layer 26a is provided on the surface of first end surface 12e of stacked body 12 and extends from first end surface 12e to cover a portion of second main surface 12b.

Second underlying electrode layer 26b is provided on the surface of second end surface 12f of stacked body 12 and extends from second end surface 12f to cover a portion of second main surface 12b.

Each of first and second underlying electrode layers 26a, 26b (hereinafter also simply referred to as underlying electrode layers) preferably includes at least one selected from, for example, a baked layer, a conductive resin layer, and a thin film layer.

Firstly, first and second underlying electrode layers 26a, 26b each made a baked layer are described.

The baked layer includes glass and metal. Examples of the metal included in baked layer include at least one selected from, for example, Cu, Ni, Ag, Pd, Ag—Pd alloy, and Au. Examples of the glass included in the baked layer include at least one selected from, for example, B, Si, Ba, Mg, Al, and Li. The baked layer may include a plurality of layers. The baked layer is produced by applying a conductive paste including glass and metal to stacked body 12 and then baking it. The baking may be performed simultaneously with or after the firing of ceramic layers 14 and internal electrode layers 16.

The baked layer of each of first underlying electrode layer 26a located on first end surface 12e and second underlying electrode layer 26b located on second end surface 12f preferably has a thickness of not less than about 5 μm and not more than about 500 μm, at the center in the height direction, for example.

Secondly, first and second underlying electrode layers 26a, 26b each including a conductive resin layer are described.

The conductive resin layer may be provided on and cover the surface of the baked layer, or may be directly provided on the surface of stacked body 12.

The conductive resin layer includes thermosetting resin and metal. The conductive resin layer, which includes thermosetting resin, is more flexible than a conductive layer of plating film or fired conductive paste. Accordingly, even if physical impacts or impacts due to heat cycle are applied to the multilayer ceramic capacitor, the conductive resin layer is able to define and function as a buffer layer, thus significantly reducing or preventing cracks in the multilayer ceramic capacitor.

Examples of the metal included in the conductive resin layer include Ag, Cu, and alloys of Ag and/or Cu. Metal powder coated with Ag may also be used, in which case Cu or Ni is preferably included as the metal powder, for example. Oxidation-resistant Cu may also be used. Conductive metal powder of Ag is particularly preferred as a metal included in the conductive resin layer. In particular, Ag is suitable for an electrode material for its lowest specific resistance among metals, and Ag, a precious metal, is highly resistant to oxidation and weather. Metal coated with Ag is also preferred as a metal included in the conductive resin layer. A metal coated with Ag is able to reduce the cost by including a low-cost metal as a base material, while maintaining the characteristics of Ag.

The percentage by volume of the metal in the entire conductive resin layer is preferably not less than about 35 vol % and not more than about 75 vol %, for example.

The metal (conductive filler) included in the conductive resin layer may have any shape. The conductive filler may be spherical and/or flat metal powder, more preferably, a mixture of spherical and flat metal powders, for example.

The metal (conductive filler) included in the conductive resin layer may have any average particle diameter. The conductive filler may preferably have an average particle diameter of about not less than about 0.3 μm and not more than about 10 μm, for example.

The metal (conductive filler) included in the conductive resin layer mainly contributes to the ability to carry electricity of the conductive resin layer. Specifically, when conductive fillers come into contact with each other, a current-carrying path is provided inside the conductive resin layer.

As the resin for the conductive resin layer, any of various publicly known thermosetting resins may be used, for example, epoxy resins, phenolic resins, urethane resins, silicone resins, and polyimide resins. Among these, an epoxy resin is one of the most preferable resins due to its excellent heat resistance, moisture resistance, and adhesion.

The percentage by volume of the resin in the entire conductive resin layer is preferably not less than about 25 vol % and not more than about 65 vol %, for example.

The conductive resin layer preferably includes a curing agent as well as a thermosetting resin, for example. If an epoxy resin is used as the base resin, a curing agent for the epoxy resin may be any of various publicly known compounds, for example, phenolic resin compounds, amine compounds, acid anhydride compounds, and imidazole compounds.

The conductive resin layer of each of first underlying electrode layer 26a located on first end surface 12e and second underlying electrode layer 26b located on second end surface 12f preferably has a thickness of about, for example, not less than about 10 μm and not more than about 200 μm, for example, at the center in the height direction.

If the underlying electrode layer is provided on the surface of each of first and second main surfaces 12a, 12b and first and second lateral surfaces 12c, 12d, the conductive resin layer of each of first and second underlying electrode layers 26a, 26b located on the surfaces of first and second main surfaces 12a, 12b and first and second lateral surfaces 12c, 12d preferably has a thickness of about not less than about 5 μm and not more than about 50 μm, at the center in the length direction, for example.

If the underlying electrode layer is a thin film layer, it is preferably a layer having a thickness of about 1 μm or less, for example, formed by depositing metal particles by sputtering, vapor deposition, or any other thin-film formation technique, for example.

First plating layer 28a covers first underlying electrode layer 26a. Specifically, first plating layer 28a is provided on the surface of first underlying electrode layer 26a on first end surface 12e, and extends to the surface of first underlying electrode layer 26a on second main surface 12b.

Second plating layer 28b covers second underlying electrode layer 26b. Specifically, second plating layer 28b is provided on the surface of second underlying electrode layer 26b on second end surface 12f, and extends to the surface of second underlying electrode layer 26b on second main surface 12b.

Each of first and second plating layers 28a, 28b (hereinafter also simply referred to as plating layers) preferably includes at least one selected from, for example, Cu, Ni, Sn, Ag, Pd, Ag—Pd alloy, and Au.

Each of first and second plating layers 28a, 28b may include a plurality of layers. In the first preferred embodiment, first plating layer 28a has a double-layer structure including a Ni plating layer 30a and a Sn plating layer 32a, and second plating layer 28b has a double-layer structure including a Ni plating layer 30b and a Sn plating layer 32b. Since Ni plating layer 30a covers the surface of first underlying electrode layer 26a, and Ni plating layer 30b covers the surface of second underlying electrode layer 26b, the underlying electrode layers are able to be significantly reduced or prevented from being eroded by the mounting solder when multilayer ceramic capacitor 10 is mounted. Further, since Sn plating layer 32a covers the surface of Ni plating layer 30a, and Sn plating layer 32b covers the surface of Ni plating layer 30b, the mounting solder has significantly increased wettability and thus the multilayer ceramic capacitor 10 is able to be easily mounted.

Each plating layer preferably has a thickness of not less than about 2 μm and not more than about 15 μm, for example.

Each external electrode 24 may include only a plating layer, with no underlying electrode layer. A structure in which a plating layer is formed with no underlying electrode layer will now be described.

For each of first and second external electrodes 24a, 24b, a plating layer may be directly formed on the surface of stacked body 12, with no underlying electrode layer. That is, multilayer ceramic capacitor 10 may have a plating layer electrically connected to first internal electrode layers 16a or second internal electrode layers 16b. In this case, a catalyst may be applied to the surface of stacked body 12 as a pretreatment before the plating layer is formed.

The plating layer preferably includes, for example, a lower plating electrode provided on the surface of stacked body 12, and an upper plating electrode provided on the surface of the lower plating electrode.

Each of the lower and upper plating electrodes preferably includes at least one metal selected from, for example, Cu, Ni, Sn, Pb, Au, Ag, Pd, Bi, and Zn; or an alloy including any of these metals.

The lower plating electrode is preferably made of includes Ni, which is able to define and function as a barrier against solder, for example. The upper plating electrode is preferably made of, for example, Sn or Au, which have good solder wettability. If first and second internal electrode layers 16a, 16b are made Ni, for example, the lower plating electrode is preferably made of Cu, which has good bondability to Ni. The upper plating electrode is optional, that is, each of first and second external electrodes 24a, 24b may include only the lower plating electrode.

The plating layer may include the upper plating electrode as an outermost layer, or may include an additional plating electrode on the surface of the upper plating electrode.

With no underlying electrode layer, each plating layer preferably has a thickness of not less than about 1 μm and not more than about 15 μm, for example. The plating layer is preferably free from glass, for example. The percentage of metal in the plating layer per unit volume is preferably about 99 vol % or more, for example.

Further, a semiconductor layer 40a is provided at the interface between stacked body 12 and first external electrode 24a located on a portion of the surface of second main surface 12b, and a semiconductor layer 40b is provided at the interface between stacked body 12 and second external electrode 24b located on a portion of the surface of second main surface 12b.

Specifically, if first plating layer 28a includes Ni plating layer 30a provided on first underlying electrode layer 26a and Sn plating layer 32a provided on Ni plating layer 30a, semiconductor layer 40a is provided continuously at the interface between stacked body 12 and first underlying electrode layer 26a, the interface between stacked body 12 and Ni plating layer 30a, and the interface between stacked body 12 and Sn plating layer 32a, the interfaces being located on second main surface 12b. If second plating layer 28b includes Ni plating layer 30b provided on second underlying electrode layer 26b and Sn plating layer 32b provided on Ni plating layer 30b, semiconductor layer 40b is provided continuously at the interface between stacked body 12 and second underlying electrode layer 26b, the interface between stacked body 12 and Ni plating layer 30b, and the interface between stacked body 12 and Sn plating layer 32b, the interfaces being located on second main surface 12b.

Semiconductor layer 40a may be provided at least only at the interface between stacked body 12 and first plating layer 28a provided on the surface of first underlying electrode layer 26a. Semiconductor layer 40b may be provided at least only at the interface between stacked body 12 and second plating layer 28b provided on the surface of second underlying electrode layer 26b.

Semiconductor layers 40a, 40b may be provided separately from the surface of stacked body 12. In other words, while the semiconductor layers may be provided as a portion of the surface of stacked body 12, the semiconductor layers may instead be provided as separate bodies on the surface of stacked body 12.

If first plating layer 28a includes Ni plating layer 30a provided on first underlying electrode layer 26a and Sn plating layer 32a provided on Ni plating layer 30a, semiconductor layer 40a may be provided only at the interface between stacked body 12 and Ni plating layer 30a. If second plating layer 28b includes Ni plating layer 30b provided on second underlying electrode layer 26b and Sn plating layer 32b provided on Ni plating layer 30b, semiconductor layer 40b may be provided only at the interface between stacked body 12 and Ni plating layer 30b.

Asperity 50 is provided on the entire or substantially the entire surface of semiconductor layer 40a on second main surface 12b, and on the entire or substantially the entire surface of semiconductor layer 40b on second main surface 12b (in the drawings, the shape of asperity 50 is not shown, but only the locations of asperity 50 on the surfaces of semiconductor layers 40a, 40b are indicated by the reference sign).

As shown in the enlarged view of region IIIB in FIG. 3B, dimension d1 is preferably larger than, for example, about ½ of thickness t of each of plating layers 28a, 28b, where dimension d1 is the dimension of the portion of semiconductor layer 40a that is located between stacked body 12 and first plating layer 28a on stacked body 12 in length direction z connecting first end surface 12e and second end surface 12f, or the dimension of the portion of semiconductor layer 40b that is located between stacked body 12 and second plating layer 28b on stacked body 12 in length direction z connecting first end surface 12e and second end surface 12f. Accordingly, a flux included in solder and corrosive gases is able to be significantly reduced or prevented from penetrating a less corrosion-resistant bonding portion between stacked body 12 and external electrodes 24. Thus, the reliability of multilayer ceramic capacitor 10 is significantly improved.

Dimension d1 is preferably smaller than, for example, about Lm/3, where Lm denotes the dimension of each outer layer section 15a of stacked body 12. In particular, a large dimension d1 would increase the risk of migration and creeping discharge, since semiconductor layers 40a, 40b and plating layers 28*a*, 28*b* formed on semiconductor layers 40*a*, 40*b* have a low electrical resistance.

Further, thickness d2 of semiconductor layers 40*a*, 40*b* in height direction x is preferably smaller than, for example, about ⅔ of the thickness of each outer layer section 15*a* in height direction x. Accordingly, stacked body 12, partially including semiconductors, is able to significantly reduce insulation resistance of outer layer section 15*a*, thereby significantly reducing or preventing a short circuit between the outer layer and effective layer.

Semiconductor layers 40*a*, 40*b* are porous ceramic sintered layers with a large amount of oxygen defect. With a large amount of oxygen defect, semiconductor layers 40*a*, 40*b* have a low electrical resistance. Accordingly, plating layers are able to be formed on semiconductor layers 40*a*, 40*b* by electrolytic plating.

The dimension of multilayer ceramic capacitor 10 in length direction z, including stacked body 12 and first and second external electrodes 24*a*, 24*b*, is denoted by L dimension; the dimension of multilayer ceramic capacitor 10 in height direction x, including stacked body 12 and first and second external electrodes 24*a*, 24*b*, is denoted by T dimension; and the dimension of multilayer ceramic capacitor 10 in width direction y, including stacked body 12 and first and second external electrodes 24*a*, 24*b*, is denoted by W dimension.

In multilayer ceramic capacitor 10, L dimension in length direction z is preferably not less than, for example, about 0.2 mm and not more than about 10.0 mm, W dimension in width direction y is preferably not less than, for example, about 0.1 mm and not more than about 10.0 mm, and T dimension in height direction x is preferably not less than, for example, about 0.1 mm and not more than about 5.0 mm.

According to multilayer ceramic capacitor 10 shown in FIG. 1, semiconductor layer 40*a* is provided at the interface between stacked body 12 and first external electrode 24*a* located on a portion of second main surface 12*b*, and semiconductor layer 40*b* is provided at the interface between stacked body 12 and second external electrode 24*b* located on a portion of second main surface 12*b*. Semiconductor layers 40*a*, 40*b* have a large amount of oxygen defect and thus have a low electrical resistance. Accordingly, first and second plating layers 28*a*, 28*b* are able to be formed on semiconductor layers 40*a*, 40*b* by electrolytic plating. Specifically, first and second plating layers 28*a*, 28*b* are formed by growing plating layers on asperity 50 on the surfaces of semiconductor layers 40*a*, 40*b*, so that the plating layers are able to be tightly formed deep into the dips of the asperity. Accordingly, the penetration of a flux component of solder and gasses (e.g., an exhaust gas and a gas generated from lubricating oil in an engine and transmission of a vehicle), through the interface between stacked body 12 and external electrodes 24, is able to be significantly reduced or prevented. Thus, multilayer ceramic capacitor 10 is able to be significantly improved in corrosion resistance and therefore reliability.

Figure 6:
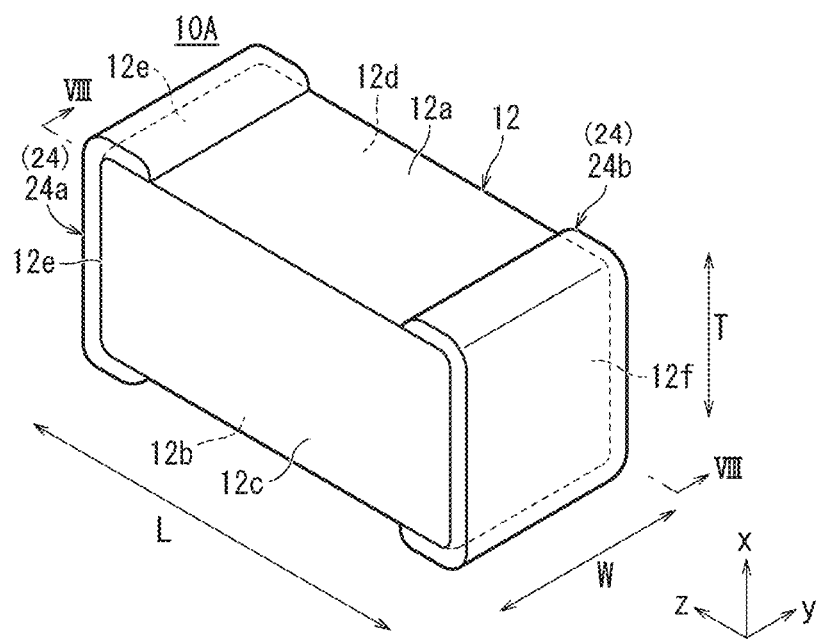
FIG. 6 is an outside perspective view of a multilayer ceramic capacitor in a second preferred embodiment of the present invention.
Figure 7:
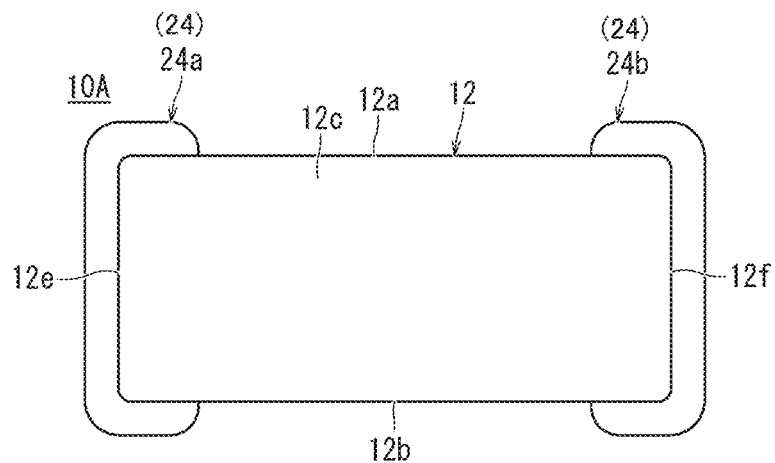
FIG. 7 is a front view of the multilayer ceramic capacitor shown in FIG. 6.
Figure 8:
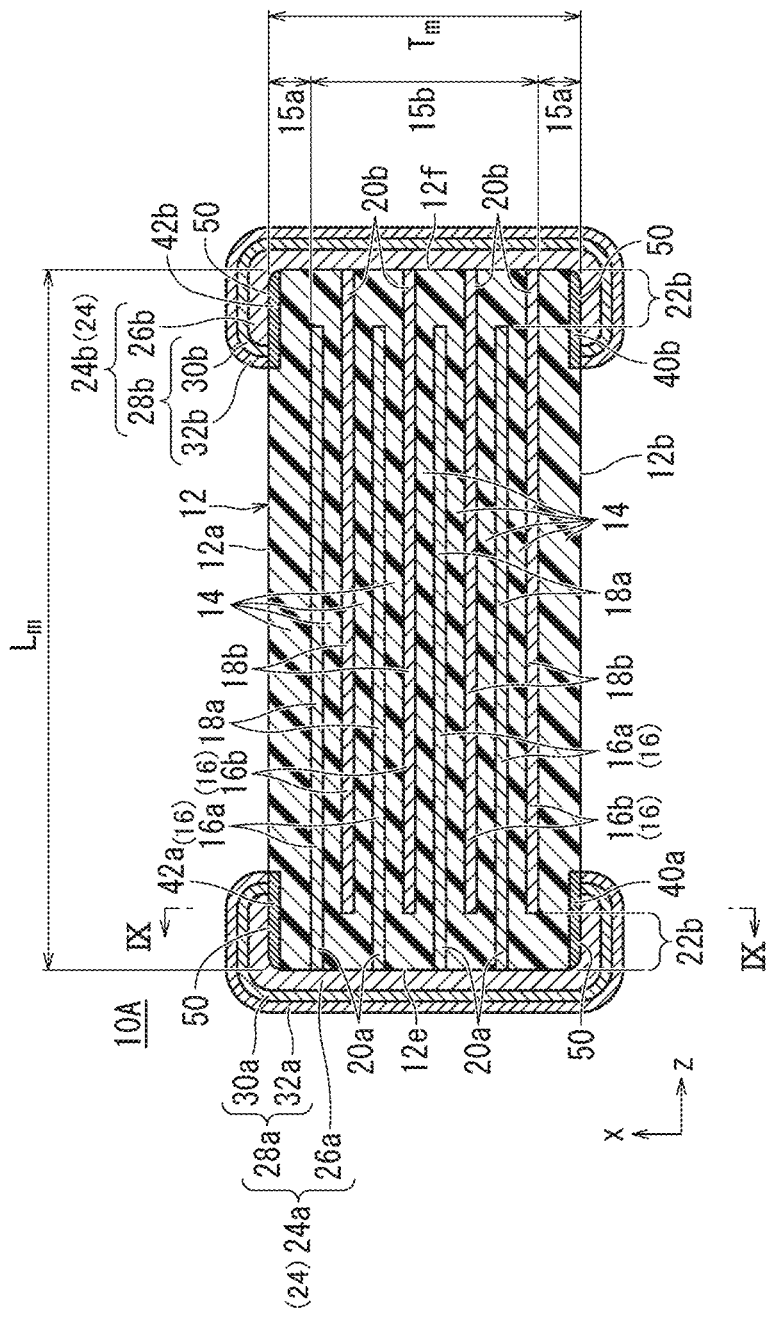
FIG. 8 is a cross-sectional view taken along line VIII-VIII shown in FIG. 6.
Figure 9:
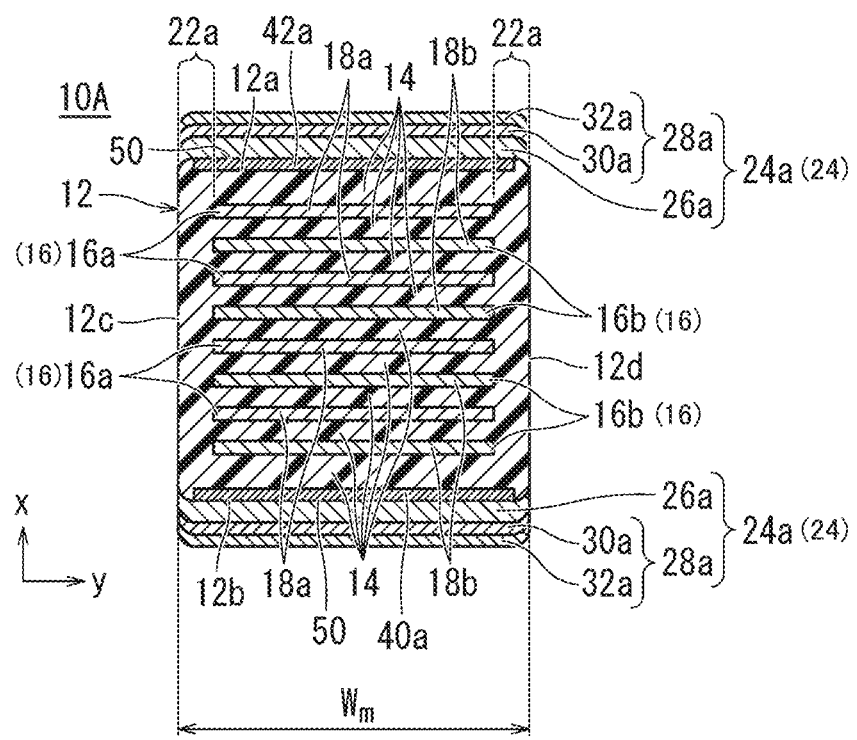
FIG. 9 is a cross-sectional view taken along line IX-IX shown in FIG. 8.

A multilayer ceramic capacitor in a second preferred embodiment of the present invention will now be described. FIG. 6 is an outside perspective view of a multilayer ceramic capacitor in the second preferred embodiment. FIG. 7 is a front view of the multilayer ceramic capacitor shown in FIG. 6. FIG. 8 is a cross-sectional view taken along line VIII-VIII shown in FIG. 6. FIG. 9 is a cross-sectional view taken along line IX-IX shown in FIG. 8.

In a multilayer ceramic capacitor 10A shown in FIGS. 6 to 9, the components or elements identical or similar to those of multilayer ceramic capacitor 10 shown in FIGS. 1 to 4 are denoted by identical reference signs, and redundant description is omitted.

Multilayer ceramic capacitor 10A shown in FIGS. 6 to 9 is different from multilayer ceramic capacitor 10 shown in FIGS. 1 to 4 in that external electrode 24 is provided not only on second main surface 12*b* but also on a portion of first main surface 12*a*, and in that the semiconductor layer is provided not only on second main surface 12*b* but also on first main surface 12*a*.

First external electrode 24*a* is provided on the surface of first end surface 12*e* of stacked body 12 and extends from first end surface 12*e* to cover a portion of each of first and second main surfaces 12*a*, 12*b*. In this case, first external electrode 24*a* is electrically connected to first leading electrode portions 18*a* of first internal electrode layers 16*a*.

Second external electrode 24*b* is provided on the surface of second end surface 12*f* of stacked body 12 and extends from second end surface 12*f* to cover a portion of each of first and second main surfaces 12*a*, 12*b*. In this case, second external electrode 24*b* is electrically connected to second leading electrode portions 18*b* of second internal electrode layers 16*b*.

As shown in FIG. 8, first external electrode 24*a* includes first underlying electrode layer 26*a* and first plating layer 28*a* provided on the surface of first underlying electrode layer 26*a*, in this order from the stacked body 12 side. Similarly, second external electrode 24*b* includes second underlying electrode layer 26*b* and second plating layer 28*b* provided on the surface of second underlying electrode layer 26*b*, in this order from the stacked body 12 side.

First underlying electrode layer 26*a* is provided on the surface of first end surface 12*e* of stacked body 12 and extends from first end surface 12*e* to cover a portion of each of first and second main surfaces 12*a*, 12*b*.

Second underlying electrode layer 26*b* is provided on the surface of second end surface 12*f* of stacked body 12 and extends from second end surface 12*f* to cover a portion of each of first and second main surfaces 12*a*, 12*b*.

First plating layer 28*a* covers first underlying electrode layer 26*a*. Specifically, first plating layer 28*a* is provided on the surface of first underlying electrode layer 26*a* on first end surface 12*e*, and extends to the surface of first underlying electrode layer 26*a* on first and second main surfaces 12*a*, 12*b*.

Second plating layer 28*b* covers second underlying electrode layer 26*b*. Specifically, second plating layer 28*b* is provided on the surface of second underlying electrode layer 26*b* on second end surface 12*f*, and extends to the surface of second underlying electrode layer 26*b* on first and second main surfaces 12*a*, 12*b*.

In multilayer ceramic capacitor 10A shown in FIGS. 6 to 9, semiconductor layer 40*a* is provided at the interface between stacked body 12 and first external electrode 24*a* located on a portion of second main surface 12*b*, and semiconductor layer 40*b* is provided at the interface between stacked body 12 and second external electrode 24*b* located on a portion of second main surface 12*b*.

Specifically, if first plating layer 28*a* includes Ni plating layer 30*a* provided on first underlying electrode layer 26*a* and Sn plating layer 32*a* provided on Ni plating layer 30*a*, semiconductor layer 40*a* is provided continuously at the interface between stacked body 12 and first underlying electrode layer 26*a*, the interface between stacked body 12 and Ni plating layer 30*a*, and the interface between stacked body 12 and Sn plating layer 32*a*, the interfaces being located on second main surface 12*b*. If second plating layer 28b includes Ni plating layer 30b provided on second underlying electrode layer 26b and Sn plating layer 32b provided on Ni plating layer 30b, semiconductor layer 40b is provided continuously at the interface between stacked body 12 and second underlying electrode layer 26b, the interface between stacked body 12 and Ni plating layer 30b, and the interface between stacked body 12 and Sn plating layer 32b, the interfaces being located on second main surface 12b.

Asperity 50 is provided on the entire or substantially the entire surface of semiconductor layer 40a on second main surface 12b, and on the entire or substantially the entire surface of semiconductor layer 40b on second main surface 12b.

Further, in multilayer ceramic capacitor 10A shown in FIGS. 6 to 9, a semiconductor layer 42a is provided at the interface between stacked body 12 and first external electrode 24a located on a portion of first main surface 12a, and a semiconductor layer 42b is provided at the interface between stacked body 12 and second external electrode 24b located on a portion of first main surface 12a.

Specifically, if first plating layer 28a includes Ni plating layer 30a provided on first underlying electrode layer 26a and Sn plating layer 32a provided on Ni plating layer 30a, semiconductor layer 42a is provided continuously at the interface between stacked body 12 and first underlying electrode layer 26a, the interface between stacked body 12 and Ni plating layer 30a, and the interface between stacked body 12 and Sn plating layer 32a, the interfaces being located on first main surface 12a. If second plating layer 28b includes Ni plating layer 30b provided on second underlying electrode layer 26b and Sn plating layer 32b provided on Ni plating layer 30b, semiconductor layer 42b is provided continuously at the interface between stacked body 12 and second underlying electrode layer 26b, the interface between stacked body 12 and Ni plating layer 30b, and the interface between stacked body 12 and Sn plating layer 32b, the interfaces being located on first main surface 12a.

Asperity 50 is provided on the entire or substantially the entire surface of semiconductor layer 42a on first main surface 12a, and on the entire or substantially the entire surface of semiconductor layer 42b on first main surface 12a.

Multilayer ceramic capacitor 10A shown in FIG. 6 provides the following advantageous effects, as well as the same or similar advantageous effects as those of multilayer ceramic capacitor 10 shown in FIG. 1.

Since the semiconductor layer is provided not only on second main surface 12b but also on first main surface 12a, the need for the distinction depending on the direction in height direction x is eliminated. Accordingly, the multilayer ceramic capacitor 10A is able to be easily disposed in a carrier tape or mounted on a mounting board.

Figure 10:
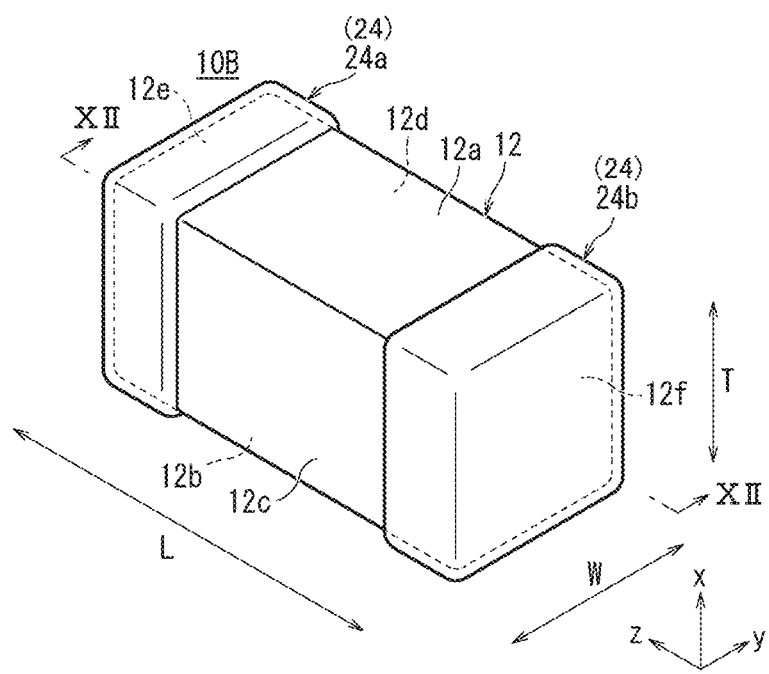
FIG. 10 is an outside perspective view of a multilayer ceramic capacitor in a third preferred embodiment of the present invention.
Figure 11:
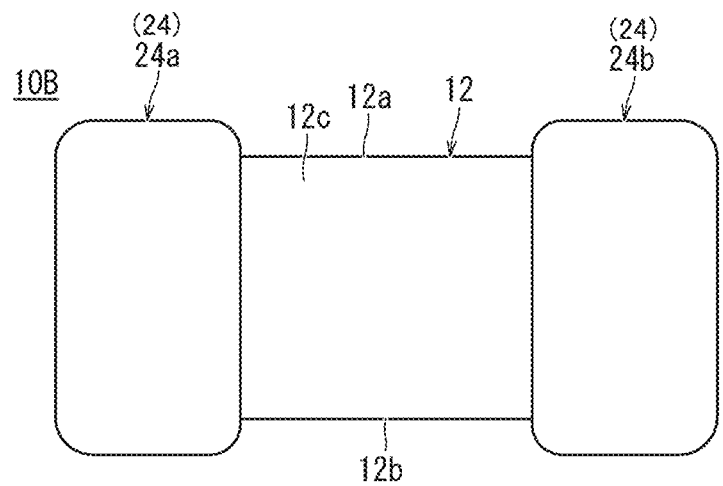
FIG. 11 is a front view of the multilayer ceramic capacitor shown in FIG. 10.
Figure 12:
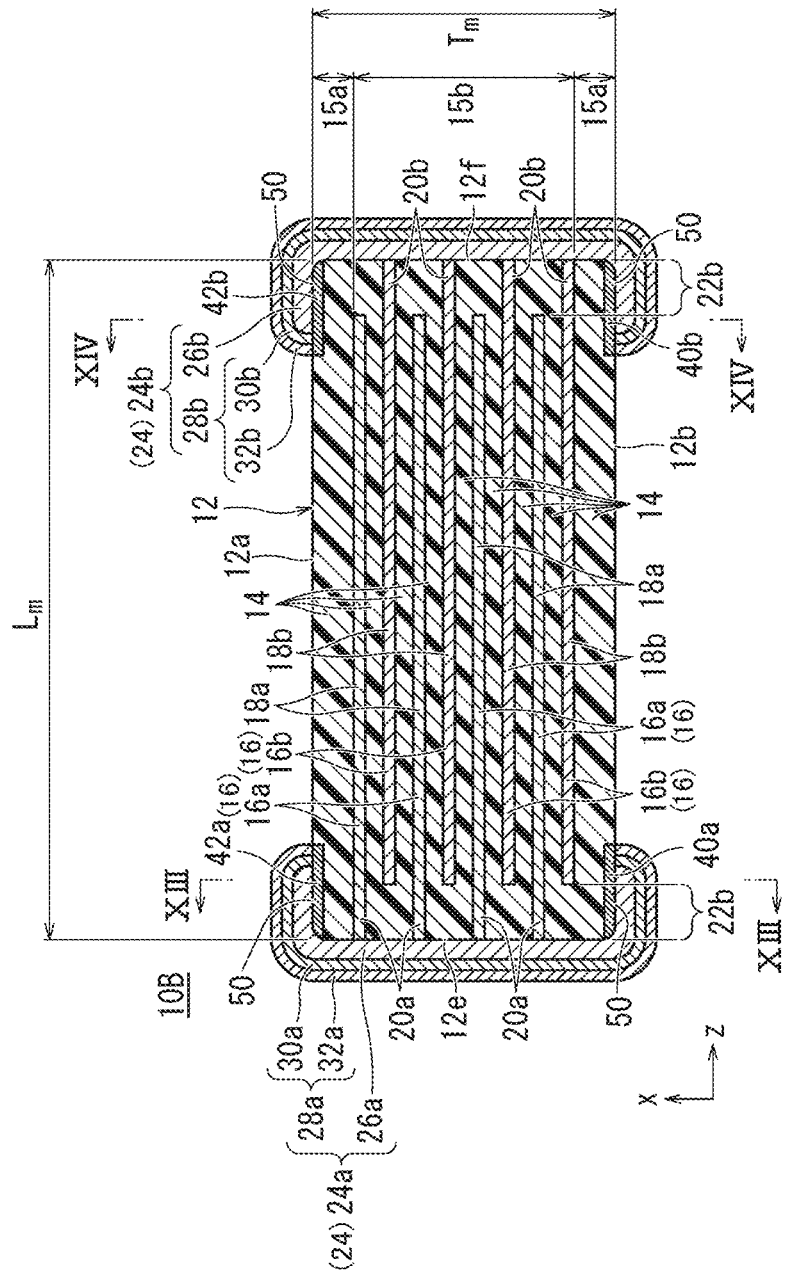
FIG. 12 is a cross-sectional view taken along line XII-XII shown in FIG. 10.
Figure 13:
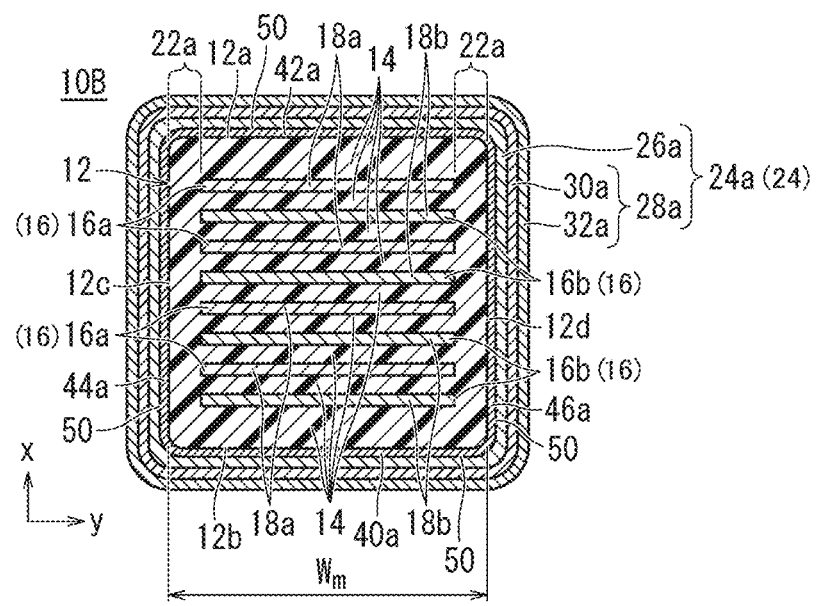
FIG. 13 is a cross-sectional view taken along line XIII-XIII shown in FIG. 12.
Figure 14:
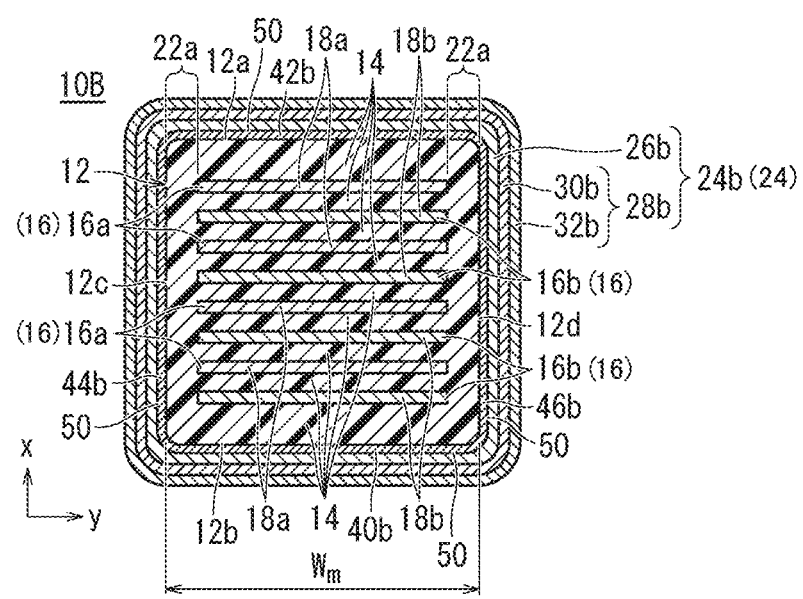
FIG. 14 is a cross-sectional view taken along line XIV-XIV shown in FIG. 12.

A multilayer ceramic capacitor in a third preferred embodiment of the present invention will now be described. FIG. 10 is an outside perspective view of a multilayer ceramic capacitor in the third preferred embodiment. FIG. 11 is a front view of the multilayer ceramic capacitor shown in FIG. 10. FIG. 12 is a cross-sectional view taken along line XII-XII shown in FIG. 10. FIG. 13 is a cross-sectional view taken along line XIII-XIII shown in FIG. 12. FIG. 14 is a cross-sectional view taken along line XIV-XIV shown in FIG. 12.

In a multilayer ceramic capacitor 10B shown in FIGS. 10 to 14, the components or elements identical or similar to those of multilayer ceramic capacitor 10 shown in FIGS. 1 to 4 are denoted by identical reference signs, and redundant description is omitted.

Multilayer ceramic capacitor 10B shown in FIGS. 10 to 14 is different in configuration from multilayer ceramic capacitor 10 shown in FIGS. 1 to 4 in that external electrode 24 is provided not only on second main surface 12b but also on a portion of each of first main surface 12a and first and second lateral surfaces 12c, 12d, and in that the semiconductor layer is provided not only on second main surface 12b but also on first main surface 12a, first lateral surface 12c, and second lateral surface 12d.

First external electrode 24a is provided on the surface of first end surface 12e of stacked body 12 and extends from first end surface 12e to cover a portion of each of first and second main surfaces 12a, 12b and first and second lateral surfaces 12c, 12d. In this case, first external electrode 24a is electrically connected to first leading electrode portions 18a of first internal electrode layers 16a.

Second external electrode 24b is provided on the surface of second end surface 12f of stacked body 12 and extends from second end surface 12f to cover a portion of each of first and second main surfaces 12a, 12b and first and second lateral surfaces 12c, 12d. In this case, second external electrode 24b is electrically connected to second leading electrode portions 18b of second internal electrode layers 16b.

As shown in FIG. 12, first external electrode 24a includes first underlying electrode layer 26a and first plating layer 28a provided on the surface of first underlying electrode layer 26a, in this order from the stacked body 12 side. Similarly, second external electrode 24b includes second underlying electrode layer 26b and second plating layer 28b provided on the surface of second underlying electrode layer 26b, in this order from the stacked body 12 side.

First underlying electrode layer 26a is provided on the surface of first end surface 12e of stacked body 12 and extends from first end surface 12e to cover a portion of each of first and second main surfaces 12a, 12b and first and second lateral surfaces 12c, 12d.

Second underlying electrode layer 26b is provided on the surface of second end surface 12f of stacked body 12 and extends from second end surface 12f to cover a portion of each of first and second main surfaces 12a, 12b and first and second lateral surfaces 12c, 12d.

First plating layer 28a covers first underlying electrode layer 26a. Specifically, first plating layer 28a is provided on the surface of first underlying electrode layer 26a on first end surface 12e, and extends to the surface of first underlying electrode layer 26a on first and second main surfaces 12a, 12b and first and second lateral surfaces 12c, 12d.

Second plating layer 28b covers second underlying electrode layer 26b. Specifically, second plating layer 28b is provided on the surface of second underlying electrode layer 26b on second end surface 12f, and extends to the surface of second underlying electrode layer 26b on first and second main surfaces 12a, 12b and first and second lateral surfaces 12c, 12d.

In multilayer ceramic capacitor 10B shown in FIGS. 10 to 14, semiconductor layer 40a is provided at the interface between stacked body 12 and first external electrode 24a located on a portion of second main surface 12b, and semiconductor layer 40b is provided at the interface between stacked body 12 and second external electrode 24b located on a portion of second main surface 12b.

Further, in multilayer ceramic capacitor 10B shown in FIGS. 10 to 14, semiconductor layer 42a is provided at the interface between stacked body 12 and first external electrode 24a located on a portion of first main surface 12a, and semiconductor layer 42b is provided at the interface between stacked body 12 and second external electrode 24b located on a portion of first main surface 12a.

Asperity 50 is provided on the entire or substantially the entire surface of semiconductor layer 40a on second main surface 12b, and on the entire or substantially the entire surface of semiconductor layer 40b on second main surface 12b.

Asperity 50 is also provided on the entire or substantially the entire surface of semiconductor layer 42a on first main surface 12a, and on the entire or substantially the entire surface of semiconductor layer 42b on first main surface 12a.

Further, in multilayer ceramic capacitor 10B shown in FIGS. 10 to 14, a semiconductor layer 44a is provided at the interface between stacked body 12 and first external electrode 24a located on a portion of first lateral surface 12c, and a semiconductor layer 44b is provided at the interface between stacked body 12 and second external electrode 24b located on a portion of first lateral surface 12c.

Specifically, if first plating layer 28a includes Ni plating layer 30a provided on first underlying electrode layer 26a and Sn plating layer 32a provided on Ni plating layer 30a, semiconductor layer 44a is provided continuously at the interface between stacked body 12 and first underlying electrode layer 26a, the interface between stacked body 12 and Ni plating layer 30a, and the interface between stacked body 12 and Sn plating layer 32a, the interfaces being located on first lateral surface 12c. If second plating layer 28b includes Ni plating layer 30b provided on second underlying electrode layer 26b and Sn plating layer 32b provided on Ni plating layer 30b, semiconductor layer 44b is provided continuously at the interface between stacked body 12 and second underlying electrode layer 26b, the interface between stacked body 12 and Ni plating layer 30b, and the interface between stacked body 12 and Sn plating layer 32b, the interfaces being located on first lateral surface 12c.

Asperity 50 is provided on the entire or substantially the entire surface of semiconductor layer 44a on first lateral surface 12c, and on the entire or substantially the entire surface of semiconductor layer 44b on first lateral surface 12c.

Further, in multilayer ceramic capacitor 10B shown in FIGS. 10 to 14, a semiconductor layer 46a is provided at the interface between stacked body 12 and first external electrode 24a located on a portion of second lateral surface 12d, and a semiconductor layer 46b is provided at the interface between stacked body 12 and second external electrode 24b located on a portion of second lateral surface 12d.

Specifically, if first plating layer 28a includes Ni plating layer 30a provided on first underlying electrode layer 26a and Sn plating layer 32a provided on Ni plating layer 30a, semiconductor layer 46a is provided continuously at the interface between stacked body 12 and first underlying electrode layer 26a, the interface between stacked body 12 and Ni plating layer 30a, and the interface between stacked body 12 and Sn plating layer 32a, the interfaces being located on second lateral surface 12d. If second plating layer 28b includes Ni plating layer 30b provided on second underlying electrode layer 26b and Sn plating layer 32b provided on Ni plating layer 30b, semiconductor layer 46b is provided continuously at the interface between stacked body 12 and second underlying electrode layer 26b, the interface between stacked body 12 and Ni plating layer 30b, and the interface between stacked body 12 and Sn plating layer 32b, the interfaces being located on second lateral surface 12d.

Asperity 50 is provided on the entire or substantially the entire surface of semiconductor layer 46a on second lateral surface 12d, and on the entire or substantially the entire surface of semiconductor layer 46b on second lateral surface 12d.

Multilayer ceramic capacitor 10B shown in FIG. 9 provides the following advantageous effects, as well as the same or similar advantageous effects as those of multilayer ceramic capacitor 10 shown in FIG. 1.

Since the semiconductor layer is provided not only on second main surface 12b but also on first main surface 12a, first lateral surface 12c, and second lateral surface 12d, the need for the distinction depending on the direction in width direction y as well as height direction x is eliminated. Accordingly, the multilayer ceramic capacitor 10B is able to be more easily placed in a carrier tape or mounted on a mounting board.

2. Method for Manufacturing Multilayer Ceramic Electronic Component

A method for manufacturing a multilayer ceramic electronic component according to a preferred embodiment of the present invention will now be described. Here, a method for manufacturing multilayer ceramic capacitor 10 described above is described, as a multilayer ceramic electronic component.

First, ceramic green sheets and a conductive paste for the internal electrodes are prepared. The ceramic green sheets and the conductive paste for the internal electrodes include binders and solvents, which may be any of publicly known organic binders and organic solvents.

Next, the ceramic green sheets are printed with the conductive paste for the internal electrodes in a prescribed pattern by, for example, screen printing or gravure printing, to form internal electrode patterns.

Then, a prescribed number of ceramic green sheets with no internal electrode pattern are stacked for an outer layer. On these sheets, ceramic green sheets with the internal electrode pattern printed thereon are stacked one after another. Further, a prescribed number of ceramic green sheets with no internal electrode pattern are stacked for an outer layer. Thus, a sheet stack is produced.

The sheet stack is then pressed in the stacking direction by, for example, isostatic press, thus producing a multilayer block.

Then, the multilayer block is cut into pieces having a prescribed shape and size, thus producing raw multilayer chips. At this time, the corners and ridge lines of each raw multilayer chip may be rounded by, for example, barrel polishing.

Next, the raw multilayer chip is fired, thus producing stacked body 12. The firing temperature is preferably, for example, not less than about 900° C. and not more than about 1400° C., depending on the materials of the dielectric and internal electrode layers.

Then, in the produced stacked body 12, a portion of stacked body 12 where the semiconductor layers are to be formed is irradiated with a laser to form semiconductor layers 40a, 40b. At this time, the electrical resistance of semiconductor layers 40a, 40b and the thickness of the porous layers are able to be controlled by adjusting the laser frequency and adjusting the frequency, amplitude, and duty cycle of the pulse wave to be input to the laser.

Semiconductor layers 40*a*, 40*b* may be formed by, for example, printing a material of semiconductor layers 40*a*, 40*b* on a region of stacked body 12 where the semiconductor layers are to be formed.

Then, external electrodes 24 are formed on both end surfaces of stacked body 12 on which semiconductor layers 40*a*, 40*b* have been formed.

Firstly, a method for forming an underlying electrode layer is described in a case in which the underlying electrode layer of each external electrode 24 is a baked layer.

For forming a baked layer of external electrode 24, a conductive paste for the external electrode, including glass component and metal, is applied by dipping to the exposed portion of first leading electrode portions 20*a* of first internal electrode layers 16*a* exposed at first end surface 12*e* on the surface of stacked body 12, for example. The conductive paste is then baked, thus forming a first underlying electrode layer. Similarly, for forming a baked layer of external electrode 24, a conductive paste for the external electrode, including glass component and metal, is applied by dipping to the exposed portion of second leading electrode portions 20*b* of second internal electrode layers 16*b* exposed at second end surface 12*f* of stacked body 12, for example. The conductive paste is then baked, thus forming a second underlying electrode layer. At this time, the baking temperature is preferably, for example, not less than about 700° C. and not more than about 900° C.

Secondly, a method for forming an underlying electrode layer is described in a case in which the underlying electrode layer is a conductive resin layer.

Note that the conductive resin layer may be formed on the surface of a baked layer, or may be directly formed on the surface of stacked body 12 with no baked layer.

For forming a conductive resin layer, a conductive resin paste, including thermosetting resin and metal component, is applied to the surface of a baked layer or stacked body 12. The conductive resin paste is then heat-treated preferably at a temperature of, for example, not less than about 250° C. and not more than about 550° C., so that the resin is able to be thermally cured. Thus, a conductive resin layer is formed. The heat treatment is preferably performed under a $N_2$ atmosphere, for example. In order to significantly reduce or prevent the scattering of resin and the oxidation of metal component, the oxygen concentration is preferably about 100 ppm or less, for example.

Thirdly, a method for forming an underlying electrode layer is described in a case in which the underlying electrode layer is a thin film layer.

To form an underlying electrode layer including a thin film layer, any of thin-film formation techniques, for example, sputtering or vapor deposition, may be applied. An underlying electrode layer including a thin film layer may be a deposit of metal particles, the layer preferably having a thickness of about 1 μm or less, for example.

A plating layer may be provided on the exposed portion of internal electrode layers 16 of stacked body 12, with no underlying electrode layer provided.

Plating is performed on first and second end surfaces 12*e*, 12*f* of stacked body 12 to form an underlying plating electrode on the exposed portion of internal electrode layers 16. Any one of electrolytic plating and electroless plating may be applied for plating. However, electrolytic plating is typically preferred, since electroless plating would typically require a pretreatment with a catalyst to increase the rate of plating deposition and thus involves complication of the process. As a plating technique, barrel plating is preferably applied, for example. An upper plating electrode may be similarly formed on the surface of the lower plating electrode.

After that, a plating layer is formed on the surface of the underlying electrode layer, on the surface of the conductive resin layer or underlying plating layer, or on the surface of the upper plating layer. Thus, external electrode 24 is formed.

In multilayer ceramic capacitor 10 shown in FIG. 1, a Ni plating layer and a Sn plating layer are formed as the plating layer on the surface of the baked layer. The Ni plating layer and the Sn plating layer are formed in sequence by, for example, barrel plating.

In this way, multilayer ceramic capacitor 10 shown in FIG. 1 is manufactured.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
  a stacked body including:
    a plurality of stacked ceramic layers;
    a plurality of internal electrode layers stacked on the plurality of stacked ceramic layers;
    a first main surface and a second main surface opposite to each other in a height direction;
    a first lateral surface and a second lateral surface opposite to each other in a width direction orthogonal or substantially orthogonal to the height direction; and
    a first end surface and a second end surface opposite to each other in a length direction orthogonal or substantially orthogonal to the height direction and the width direction;
  a first external electrode provided at least on a portion of the second main surface and on the first end surface; and
  a second external electrode provided at least on another portion of the second main surface and on the second end surface; wherein
  the plurality of internal electrode layers includes:
    a first internal electrode layer exposed at the first end surface where the first internal electrode layer is electrically connected to the first external electrode; and
    a second internal electrode layer exposed at the second end surface where the second internal electrode layer is electrically connected to the second external electrode,
  the first external electrode includes:
    a first underlying electrode layer provided on the stacked body and including a conductive metal and a glass component; and
    a first plating layer covering the first underlying electrode layer;
  the second external electrode includes:
    a second underlying electrode layer provided on the stacked body and including a conductive metal and a glass component; and
    a second plating layer covering the second underlying electrode layer;

a first semiconductor layer is provided at an interface between the stacked body and a portion of the first external electrode that is located on the portion of the second main surface; and a second semiconductor layer is provided at an interface between the stacked body and a portion of the second external electrode that is located on the another portion of the second main surface.

2. The multilayer ceramic electronic component according to claim 1, wherein
a dimension of a portion of the first semiconductor layer that is located between the first plating layer and the stacked body in the length direction is larger than about ½ of a thickness of the first plating layer; and
a dimension of a portion of the second semiconductor layer that is located between the second plating layer and the stacked body in the length direction is larger than about ½ of a thickness of the second plating layer.

3. The multilayer ceramic electronic component according to claim 1, wherein
where Lm denotes a dimension of the stacked body in the length direction:
a dimension of a portion of the first semiconductor layer that is located between the first plating layer and the stacked body in the length direction is smaller than about Lm/3; and
a dimension of a portion of the second semiconductor layer that is located between the second plating layer and the stacked body in the length direction is smaller than about Lm/3.

4. The multilayer ceramic electronic component according to claim 1, wherein
the stacked body includes:
an inner layer section including the plurality of internal electrode layers; and
a plurality of outer layer sections that sandwich the inner layer section in a stacking direction; and
a thickness of each of the first semiconductor layer and the second semiconductor layer in the height direction is smaller than about ⅔ of a thickness of each of the plurality of outer layer sections in the height direction.

5. The multilayer ceramic electronic component according to claim 1, wherein
the first plating layer includes:
a Ni plating layer covering the first underlying electrode layer and covering an exposed portion of the first semiconductor layer; and
a Sn plating layer covering the Ni plating layer; and
the second plating layer includes:
a Ni plating layer covering the second underlying electrode layer and covering an exposed portion of the second semiconductor layer; and
a Sn plating layer covering the Ni plating layer.

6. The multilayer ceramic electronic component according to claim 1, wherein
the first external electrode is further provided on a portion of the first main surface;
the second external electrode is further provided on another portion of the first main surface;
a third semiconductor layer is provided at an interface between the stacked body and a portion of the first external electrode that is located on the portion of the first main surface; and
a fourth semiconductor layer is provided at an interface between the stacked body and a portion of the second external electrode that is located on the another portion of the first main surface.

7. The multilayer ceramic electronic component according to claim 1, wherein
the first external electrode is further provided on a portion of the first lateral surface and on a portion of the second lateral surface;
the second external electrode is further provided on another portion of the first lateral surface and on another portion of the second lateral surface;
a third semiconductor layer is provided at an interface between the stacked body and a portion of the first external electrode that is located on the portion of the first lateral surface;
a fourth semiconductor layer is provided at an interface between the stacked body and another portion of the first external electrode that is located on the portion of the second lateral surface;
a fifth semiconductor layer is provided at an interface between the stacked body and a portion of the second external electrode that is located on the another portion of the first lateral surface; and
a sixth semiconductor layer is provided at an interface between the stacked body and another portion of the second external electrode that is located on the another portion of the second lateral surface.

8. The multilayer ceramic electronic component according to claim 1, wherein the plurality of internal electrode layers further includes at least one floating internal electrode layer that is not electrically connected to either the first external electrode or the second external electrode.

9. The multilayer ceramic electronic component according to claim 1, wherein the multilayer ceramic electronic component is a capacitor defined by a capacitance between the first external electrode and the second external electrode.

10. The multilayer ceramic electronic component according to claim 1, wherein each of the plurality of stacked ceramic layers includes a dielectric material.

11. The multilayer ceramic electronic component according to claim 10, wherein each of the plurality of stacked ceramic layers is one of a piezoelectric ceramic, a semiconductor ceramic, and a magnetic ceramic.

12. The multilayer ceramic electronic component according to claim 1, wherein each of the plurality of internal electrode layers is parallel or substantially parallel to a mounting surface of the multilayer ceramic electronic component.

13. The multilayer ceramic electronic component according to claim 1, wherein
the first internal electrode layer includes:
a first facing electrode portion that faces the second internal electrode layer; and
a first leading electrode portion that is exposed at the first end surface; and
the second internal electrode layer includes:
a second facing electrode portion that faces the first internal electrode layer; and
a second leading electrode portion that is exposed at the second end surface.

14. The multilayer ceramic electronic component according to claim 1, wherein each of the first underlying electrode layer and the second underlying electrode layer includes at least one selected from a baked layer, a conductive resin layer, and a thin film layer.

15. The multilayer ceramic electronic component according to claim 14, wherein each of the first underlying electrode layer and the second underlying electrode layer is the conductive resin layer that includes a thermosetting resin and metal.

16. The multilayer ceramic electronic component according to claim 1, wherein asperity is provided on an entire surface of a portion of the first semiconductor layer that is located on the portion of the second main surface and on an entire surface of a portion of the second semiconductor layer that is located on another portion of the second main surface.

* * * * *